US010710006B2

(12) United States Patent
Lipkens et al.

(10) Patent No.: US 10,710,006 B2
(45) Date of Patent: Jul. 14, 2020

(54) PIEZOELECTRIC TRANSDUCER FOR GENERATION OF AN ACOUSTIC STANDING WAVE

(71) Applicant: FloDesign Sonics, Inc., Wilbraham, MA (US)

(72) Inventors: Bart Lipkens, Hampden, MA (US); Jeffrey King, Coventry, CT (US); Jack Saloio, Ludlow, MA (US); Brian McCarthy, East Longmeadow, MA (US)

(73) Assignee: FloDesign Sonics, Inc., Wilbraham, MA (US)

( * ) Notice: Subject to any disclaimer, the term of this patent is extended or adjusted under 35 U.S.C. 154(b) by 0 days.

(21) Appl. No.: 15/497,078

(22) Filed: Apr. 25, 2017

(65) Prior Publication Data

US 2017/0304746 A1    Oct. 26, 2017

Related U.S. Application Data

(60) Provisional application No. 62/327,388, filed on Apr. 25, 2016.

(51) Int. Cl.
*B01D 17/12* (2006.01)
*B06B 1/06* (2006.01)
*B01D 21/28* (2006.01)

(52) U.S. Cl.
CPC ........... *B01D 17/12* (2013.01); *B01D 21/283* (2013.01); *B06B 1/0644* (2013.01)

(58) Field of Classification Search
None
See application file for complete search history.

(56) References Cited

U.S. PATENT DOCUMENTS

| 2,473,971 | A | 6/1949 | Ross |
| 2,667,944 | A | 2/1954 | Crites |
| 3,372,370 | A | 3/1968 | Cyr |

(Continued)

FOREIGN PATENT DOCUMENTS

| DE | 30 27 433 A1 | 2/1982 |
| DE | 32 18 488 A1 | 11/1983 |

(Continued)

OTHER PUBLICATIONS

Alvarez et al.; Shock Waves, vol. 17, No. 6, pp. 441-447, 2008.

(Continued)

*Primary Examiner* — Bradley R Spies
(74) *Attorney, Agent, or Firm* — FloDesign Sonics, Inc.

(57) ABSTRACT

Transducer assemblies that can be used in acoustophoretic systems are disclosed. The acoustophoretic systems including the transducer assemblies and methods of operating the acoustophoretic systems are also disclosed. The transducer assemblies include a housing, a polymeric film attached to the housing, and a piezoelectric material attached to the polymeric film. The piezoelectric material is not attached to, and does not come in direct contact with, the housing. The piezoelectric material is configured to be driven by a drive signal to create a multi-dimensional acoustic standing wave. The piezoelectric material can be attached to the polymer film by an adhesive coating on the polymer film.

18 Claims, 15 Drawing Sheets

(56) References Cited

U.S. PATENT DOCUMENTS

| | | |
|---|---|---|
| 3,555,311 A | 1/1971 | Weber |
| 4,055,491 A | 10/1977 | Porath-Furedi |
| 4,065,875 A | 1/1978 | Srna |
| 4,118,649 A | 10/1978 | Schwartzman et al. |
| 4,158,629 A | 6/1979 | Sawyer |
| 4,165,273 A | 8/1979 | Azarov et al. |
| 4,173,725 A | 11/1979 | Asai et al. |
| 4,204,096 A | 5/1980 | Barcus et al. |
| 4,254,661 A | 3/1981 | Kossoff et al. |
| 4,320,659 A | 3/1982 | Lynnworth et al. |
| 4,344,448 A | 8/1982 | Potts |
| 4,398,325 A | 8/1983 | Piaget et al. |
| 4,552,669 A | 11/1985 | Sekellick |
| 4,666,595 A | 5/1987 | Graham |
| 4,673,512 A | 6/1987 | Schram |
| 4,699,588 A | 10/1987 | Zinn et al. |
| 4,743,361 A | 5/1988 | Schram |
| 4,759,775 A | 7/1988 | Peterson et al. |
| 4,800,316 A | 1/1989 | Wang |
| 4,821,838 A | 4/1989 | Chen |
| 4,836,684 A | 6/1989 | Javorik et al. |
| 4,860,993 A | 8/1989 | Goode |
| 4,878,210 A | 10/1989 | Mitome |
| 4,983,189 A | 1/1991 | Peterson et al. |
| 5,059,811 A | 10/1991 | King et al. |
| 5,062,965 A | 11/1991 | Bernou et al. |
| 5,085,783 A | 2/1992 | Feke et al. |
| 5,164,094 A | 11/1992 | Stuckart |
| 5,225,089 A | 7/1993 | Benes et al. |
| 5,371,429 A | 12/1994 | Manna |
| 5,395,592 A | 3/1995 | Bolleman et al. |
| 5,431,817 A | 7/1995 | Braatz et al. |
| 5,443,985 A | 8/1995 | Lu et al. |
| 5,452,267 A | 9/1995 | Spevak |
| 5,475,486 A | 12/1995 | Paoli |
| 5,484,537 A | 1/1996 | Whitworth |
| 5,527,460 A | 6/1996 | Trampler et al. |
| 5,560,362 A | 10/1996 | Sliwa, Jr. et al. |
| 5,594,165 A | 1/1997 | Madanshetty |
| 5,604,301 A | 2/1997 | Mountford et al. |
| 5,626,767 A | 5/1997 | Trampler et al. |
| 5,688,405 A | 11/1997 | Dickinson et al. |
| 5,711,888 A | 1/1998 | Trampler et al. |
| 5,831,166 A | 11/1998 | Kozuka et al. |
| 5,834,871 A | 11/1998 | Puskas |
| 5,902,489 A | 5/1999 | Yasuda et al. |
| 5,912,182 A | 6/1999 | Coakley et al. |
| 5,947,299 A | 9/1999 | Vazquez et al. |
| 5,951,456 A | 9/1999 | Scott |
| 6,090,295 A | 6/2000 | Raghavarao et al. |
| 6,166,231 A | 12/2000 | Hoeksema |
| 6,216,538 B1 | 4/2001 | Yasuda et al. |
| 6,205,848 B1 | 6/2001 | Faber et al. |
| 6,273,262 B1 | 8/2001 | Yasuda et al. |
| 6,332,541 B1 | 12/2001 | Coakley et al. |
| 6,391,653 B1 | 5/2002 | Letcher et al. |
| 6,475,151 B2 | 11/2002 | Koger et al. |
| 6,482,327 B1 | 11/2002 | Mori et al. |
| 6,487,095 B1 | 11/2002 | Malik et al. |
| 6,592,821 B1 | 7/2003 | Wada et al. |
| 6,641,708 B1 | 11/2003 | Becker et al. |
| 6,649,069 B2 | 11/2003 | DeAngelis |
| 6,699,711 B1 | 3/2004 | Hahn et al. |
| 6,727,451 B1 | 4/2004 | Fuhr et al. |
| 6,763,722 B2 | 7/2004 | Fjield et al. |
| 6,881,314 B1 | 4/2005 | Wang et al. |
| 6,929,750 B2 | 8/2005 | Laurell et al. |
| 6,936,151 B1 | 8/2005 | Lock et al. |
| 7,008,540 B1 | 3/2006 | Weavers et al. |
| 7,010,979 B2 | 3/2006 | Scott |
| 7,061,163 B2 | 6/2006 | Nagahara et al. |
| 7,081,192 B1 | 7/2006 | Wang et al. |
| 7,093,482 B2 | 8/2006 | Berndt |
| 7,108,137 B2 | 9/2006 | Lal et al. |
| 7,150,779 B2 | 12/2006 | Meegan, Jr. |
| 7,186,502 B2 | 3/2007 | Vesey |
| 7,191,787 B1 | 3/2007 | Redeker et al. |
| 7,322,431 B2 | 1/2008 | Ratcliff |
| 7,331,233 B2 | 2/2008 | Scott |
| 7,340,957 B2 | 3/2008 | Kaduchak et al. |
| 7,373,805 B2 | 5/2008 | Hawkes et al. |
| 7,541,166 B2 | 6/2009 | Belgrader et al. |
| 7,601,267 B2 | 10/2009 | Haake et al. |
| 7,673,516 B2 | 3/2010 | Janssen et al. |
| 7,837,040 B2 | 11/2010 | Ward et al. |
| 7,846,382 B2 | 12/2010 | Strand et al. |
| 7,968,049 B2 | 6/2011 | Takahashi et al. |
| 8,075,786 B2 | 12/2011 | Bagajewicz |
| 8,080,202 B2 | 12/2011 | Takahashi et al. |
| 8,134,705 B2 | 3/2012 | Kaduchak et al. |
| 8,256,076 B1 | 9/2012 | Feller |
| 8,266,950 B2 | 9/2012 | Kaduchak et al. |
| 8,273,253 B2 | 9/2012 | Curran |
| 8,273,302 B2 | 9/2012 | Takahashi et al. |
| 8,309,408 B2 | 11/2012 | Ward et al. |
| 8,319,398 B2 | 11/2012 | Vivek et al. |
| 8,334,133 B2 | 12/2012 | Fedorov et al. |
| 8,387,803 B2 | 3/2013 | Thorslund et al. |
| 8,592,204 B2 | 11/2013 | Lipkens et al. |
| 8,679,338 B2 | 3/2014 | Rietman et al. |
| 8,691,145 B2 | 4/2014 | Dionne et al. |
| 8,873,051 B2 | 10/2014 | Kaduchak et al. |
| 8,889,388 B2 | 11/2014 | Wang et al. |
| 9,272,234 B2 | 3/2016 | Lipkens et al. |
| 9,357,293 B2 | 5/2016 | Claussen |
| 9,365,815 B2 | 6/2016 | Miyazaki et al. |
| 9,368,110 B1 | 6/2016 | Hershey et al. |
| 9,388,363 B2 | 7/2016 | Goodson et al. |
| 9,391,542 B2 | 7/2016 | Wischnewskiy |
| 9,403,114 B2 | 8/2016 | Kusuura |
| 9,410,256 B2 | 8/2016 | Dionne et al. |
| 9,416,344 B2 | 8/2016 | Lipkens et al. |
| 9,421,553 B2 | 8/2016 | Dionne et al. |
| 9,422,328 B2 | 8/2016 | Kennedy, III et al. |
| 9,457,139 B2 | 10/2016 | Ward et al. |
| 9,457,302 B2 | 10/2016 | Lipkens et al. |
| 9,458,450 B2 | 10/2016 | Lipkens et al. |
| 9,464,303 B2 | 10/2016 | Burke |
| 9,476,855 B2 | 10/2016 | Ward et al. |
| 9,480,375 B2 | 11/2016 | Marshall et al. |
| 9,480,935 B2 | 11/2016 | Marieila, Jr. et al. |
| 9,488,621 B2 | 11/2016 | Kaduchak et al. |
| 9,504,780 B2 | 11/2016 | Spain et al. |
| 9,512,395 B2 | 12/2016 | Lipkens et al. |
| 9,513,205 B2 | 12/2016 | Yu et al. |
| 9,514,924 B2 | 12/2016 | Morris et al. |
| 9,517,474 B2 | 12/2016 | Mao et al. |
| 2002/0038662 A1 | 4/2002 | Schuler et al. |
| 2002/0041694 A1* | 4/2002 | Michiels ............ H04R 1/225 381/190 |
| 2002/0134734 A1 | 9/2002 | Campbell et al. |
| 2003/0015035 A1 | 1/2003 | Kaduchak et al. |
| 2003/0028108 A1 | 2/2003 | Miller et al. |
| 2003/0195496 A1 | 10/2003 | Maguire |
| 2003/0209500 A1 | 11/2003 | Kock et al. |
| 2003/0230535 A1 | 12/2003 | Affeld et al. |
| 2004/0016699 A1 | 1/2004 | Bayevsky |
| 2004/0035208 A1 | 2/2004 | Diaz et al. |
| 2004/0112841 A1 | 6/2004 | Scott |
| 2004/0124155 A1 | 7/2004 | Meegan, Jr. |
| 2004/0149039 A1 | 8/2004 | Cardelius |
| 2005/0031499 A1 | 2/2005 | Meier |
| 2005/0121269 A1 | 6/2005 | Namduri |
| 2005/0145567 A1 | 7/2005 | Quintel et al. |
| 2005/0196725 A1 | 9/2005 | Fu |
| 2006/0037915 A1 | 2/2006 | Strand et al. |
| 2006/0037916 A1 | 2/2006 | Trampler |
| 2006/0050615 A1 | 3/2006 | Swisher |
| 2007/0053795 A1 | 3/2007 | Laugharn, Jr. et al. |
| 2007/0224676 A1 | 9/2007 | Haq |
| 2007/0267351 A1 | 11/2007 | Roach et al. |
| 2007/0272618 A1 | 11/2007 | Gou et al. |
| 2007/0284299 A1 | 12/2007 | Xu et al. |
| 2008/0011693 A1 | 1/2008 | Li et al. |

(56) References Cited

U.S. PATENT DOCUMENTS

| | | |
|---|---|---|
| 2008/0067128 A1 | 3/2008 | Hoyos et al. |
| 2008/0105625 A1 | 5/2008 | Rosenberg et al. |
| 2008/0181838 A1 | 7/2008 | Kluck |
| 2008/0217259 A1 | 9/2008 | Siversson |
| 2008/0245709 A1 | 10/2008 | Kaduchak et al. |
| 2008/0245745 A1 | 10/2008 | Ward et al. |
| 2008/0264716 A1 | 10/2008 | Kuiper et al. |
| 2008/0272034 A1 | 11/2008 | Ferren et al. |
| 2008/0272065 A1 | 11/2008 | Johnson |
| 2008/0316866 A1 | 12/2008 | Goodemote et al. |
| 2009/0029870 A1 | 1/2009 | Ward et al. |
| 2009/0053686 A1 | 2/2009 | Ward et al. |
| 2009/0087492 A1 | 4/2009 | Johnson et al. |
| 2009/0098027 A1 | 4/2009 | Tabata et al. |
| 2009/0104594 A1 | 4/2009 | Webb |
| 2009/0126481 A1 | 5/2009 | Burris |
| 2009/0178716 A1 | 7/2009 | Kaduchak et al. |
| 2009/0194420 A1 | 8/2009 | Mariella, Jr. et al. |
| 2009/0227042 A1 | 9/2009 | Gauer et al. |
| 2009/0045107 A1 | 12/2009 | Ward et al. |
| 2009/0295505 A1 | 12/2009 | Mohammadi et al. |
| 2010/0000945 A1 | 1/2010 | Gavalas |
| 2010/0078323 A1 | 4/2010 | Takahashi et al. |
| 2010/0078384 A1 | 4/2010 | Yang |
| 2010/0124142 A1 | 5/2010 | Laugharn et al. |
| 2010/0139377 A1 | 6/2010 | Huang et al. |
| 2010/0192693 A1 | 8/2010 | Mudge et al. |
| 2010/0193407 A1 | 8/2010 | Steinberg et al. |
| 2010/0206818 A1 | 8/2010 | Leong et al. |
| 2010/0224437 A1* | 9/2010 | Booth .................. H04R 7/10 181/166 |
| 2010/0255573 A1 | 10/2010 | Bond et al. |
| 2010/0261918 A1 | 10/2010 | Chianelli et al. |
| 2010/0317088 A1 | 12/2010 | Radaelli et al. |
| 2010/0323342 A1 | 12/2010 | Gonzalez Gomez et al. |
| 2010/0330633 A1 | 12/2010 | Walther et al. |
| 2011/0003350 A1 | 1/2011 | Schafran et al. |
| 2011/0024335 A1 | 2/2011 | Ward et al. |
| 2011/0092726 A1 | 4/2011 | Clarke |
| 2011/0095225 A1 | 4/2011 | Eckelberry et al. |
| 2011/0123392 A1 | 5/2011 | Dionne et al. |
| 2011/0125024 A1 | 5/2011 | Mueller |
| 2011/0146678 A1 | 6/2011 | Ruecroft et al. |
| 2011/0154890 A1 | 6/2011 | Holm et al. |
| 2011/0166551 A1 | 7/2011 | Schafer |
| 2011/0189732 A1 | 8/2011 | Weinand et al. |
| 2011/0244594 A1* | 10/2011 | Horii ............... G01N 33/54373 436/501 |
| 2011/0245750 A1 | 10/2011 | Lynch et al. |
| 2011/0262990 A1 | 10/2011 | Wang et al. |
| 2011/0278218 A1 | 11/2011 | Dionne et al. |
| 2011/0281319 A1 | 11/2011 | Swayze et al. |
| 2011/0309020 A1 | 12/2011 | Rietman et al. |
| 2012/0088295 A1 | 4/2012 | Yasuda et al. |
| 2012/0145633 A1 | 6/2012 | Polizzotti et al. |
| 2012/0160746 A1* | 6/2012 | Thorslund ........ B01L 3/502761 209/552 |
| 2012/0163126 A1 | 6/2012 | Campbell et al. |
| 2012/0175012 A1 | 7/2012 | Goodwin et al. |
| 2012/0231504 A1 | 9/2012 | Niazi |
| 2012/0267288 A1 | 10/2012 | Chen et al. |
| 2012/0325727 A1 | 12/2012 | Dionne et al. |
| 2012/0325747 A1 | 12/2012 | Reitman et al. |
| 2012/0328477 A1 | 12/2012 | Dionne et al. |
| 2012/0329122 A1 | 12/2012 | Lipkens et al. |
| 2013/0017577 A1 | 1/2013 | Arunakumari et al. |
| 2013/0115664 A1 | 5/2013 | Khanna et al. |
| 2013/0175226 A1 | 7/2013 | Coussios et al. |
| 2013/0217113 A1 | 8/2013 | Srinivasan et al. |
| 2013/0277316 A1 | 10/2013 | Dutra et al. |
| 2013/0277317 A1 | 10/2013 | LoRicco et al. |
| 2013/0284271 A1 | 10/2013 | Lipkens et al. |
| 2013/0327139 A1* | 12/2013 | Goodman ............ B06B 1/0625 73/152.58 |
| 2014/0011240 A1 | 1/2014 | Lipkens et al. |
| 2014/0017758 A1 | 1/2014 | Kniep et al. |
| 2014/0102947 A1 | 4/2014 | Baym et al. |
| 2014/0141413 A1 | 5/2014 | Laugham, Jr. et al. |
| 2014/0319077 A1 | 10/2014 | Lipkens et al. |
| 2014/0377834 A1 | 12/2014 | Presz, Jr. et al. |
| 2015/0053561 A1 | 2/2015 | Ward et al. |
| 2015/0060581 A1 | 3/2015 | Santos et al. |
| 2015/0321129 A1 | 11/2015 | Lipkens et al. |
| 2016/0121331 A1 | 5/2016 | Kapur et al. |
| 2016/0123858 A1 | 5/2016 | Kapur et al. |
| 2016/0145563 A1 | 5/2016 | Berteau et al. |
| 2016/0153249 A1 | 6/2016 | Mitri |
| 2016/0175198 A1 | 6/2016 | Warner et al. |
| 2016/0184790 A1 | 6/2016 | Sinha et al. |
| 2016/0202237 A1 | 7/2016 | Zeng et al. |
| 2016/0208213 A1 | 7/2016 | Doyle et al. |
| 2016/0230168 A1 | 8/2016 | Kaduchak et al. |
| 2016/0237110 A1 | 8/2016 | Gilmanshin et al. |
| 2016/0237394 A1 | 8/2016 | Lipkens et al. |
| 2016/0237395 A1 | 8/2016 | Lipkens et al. |
| 2016/0252445 A1 | 9/2016 | Yu et al. |
| 2016/0279540 A1 | 9/2016 | Presz, Jr. et al. |
| 2016/0279551 A1 | 9/2016 | Foucault |
| 2016/0312168 A1 | 10/2016 | Pizzi |
| 2016/0314868 A1 | 10/2016 | El-Zahab et al. |
| 2016/0319270 A1 | 11/2016 | Lipkens et al. |
| 2016/0325206 A1 | 11/2016 | Presz, Jr. et al. |
| 2016/0332159 A1 | 11/2016 | Dual et al. |
| 2016/0339360 A1 | 11/2016 | Lipkens et al. |
| 2016/0347628 A1 | 12/2016 | Dionne et al. |
| 2016/0355776 A1 | 12/2016 | Lipkens et al. |
| 2016/0361670 A1 | 12/2016 | Lipkens et al. |
| 2016/0363579 A1 | 12/2016 | Lipkens et al. |

FOREIGN PATENT DOCUMENTS

| | | |
|---|---|---|
| DE | 196 48 519 A1 | 6/1998 |
| DE | 103 19 467 B3 | 7/2004 |
| DE | 10 2008 006 501 A1 | 9/2008 |
| EP | 0 292 470 B1 | 11/1988 |
| EP | 0 641 606 | 3/1995 |
| EP | 1 175 931 A1 | 1/2002 |
| EP | 1 254 669 B1 | 11/2002 |
| GB | 2 420 510 A | 5/2006 |
| JP | 9-136090 | 5/1997 |
| RU | 2085933 | 7/1997 |
| SU | 629496 | 10/1978 |
| WO | WO 1987/07178 A1 | 12/1987 |
| WO | WO 89/11899 A1 | 12/1989 |
| WO | WO 90/05008 | 3/1990 |
| WO | WO 97/34643 | 9/1997 |
| WO | WO 1998/017373 | 4/1998 |
| WO | WO 98/50133 A1 | 11/1998 |
| WO | WO 02/072234 A1 | 9/2002 |
| WO | WO 03/089567 | 10/2003 |
| WO | WO 2004/079716 A1 | 9/2004 |
| WO | WO 2009/063198 | 5/2009 |
| WO | WO 2009/111276 A1 | 9/2009 |
| WO | WO 2009/144709 A1 | 12/2009 |
| WO | WO 2010/024753 A1 | 4/2010 |
| WO | WO 2010/040394 A1 | 4/2010 |
| WO | WO 2011/023949 A2 | 3/2011 |
| WO | WO 2011/025890 A1 | 3/2011 |
| WO | WO 2011/027146 A2 | 3/2011 |
| WO | WO 2011/131947 A2 | 10/2011 |
| WO | WO 2011/161463 A2 | 12/2011 |
| WO | WO 2013/043297 A1 | 3/2013 |
| WO | WO 2013/055517 A1 | 4/2013 |
| WO | WO 2013/138797 A1 | 9/2013 |
| WO | WO 2013/148376 | 10/2013 |
| WO | WO 2013/159014 A1 | 10/2013 |
| WO | WO 2014/014941 A1 | 1/2014 |
| WO | WO 2014/029505 | 2/2014 |
| WO | WO 2014/055219 A2 | 4/2014 |
| WO | WO 2014/124306 A1 | 8/2014 |

(56) References Cited

FOREIGN PATENT DOCUMENTS

| WO | WO 2014/153651 | 10/2014 |
|---|---|---|
| WO | WO 2015/006730 | 1/2015 |

OTHER PUBLICATIONS

Benes et al.; Ultrasonic Separation of Suspended Particles, 2001 IEEE Ultrasonics Symposium; Oct. 7-10, 2001; pp. 649-659; Atlanta, Georgia.
Castilho et al.; Animal Cell Technology: From Biopharmaceuticals to Gene Therapy; 11—Animal Cell Separation; 2008.
Castro; Tunable gap and quantum quench dynamics in bilayer graphene; Jul. 13, 2010; Mathematica Summer School.
Cravotto et al.; Ultrasonics Sonochemistry, vol. 15, No. 5, pp. 898-902, 2008.
Garcia-Lopez, et al; Enhanced Acoustic Separation of Oil-Water Emulsion in Resonant Cavities. The Open Acoustics Journal. 2008, vol. 1, pp. 66-71.
Hill et al.; Ultrasonic Particle Manipulation; Microfluidic Technologies for Miniaturized Analysis Systems, Jan. 2007, pp. 359-378.
Ilinskii et al.; Acoustic Radiation Force on a Sphere in Tissue; AIP Conference Proceedings; 2012.
Kuznetsova et al.; Microparticle concentration in short path length ultrasonic resonators: Roles of radiation pressure and acoustic streaming; Journal of the Acoustical Society of America, American Institute of Physics for the Acoustical Society of America, vol. 116, No. 4, Oct. 1, 2004, pp. 1956-1966, DOI: 1.1121/1.1785831.
Latt et al.; Ultrasound-membrane hybrid processes for enhancement of filtration properties; Ultrasonics sonochemistry 13.4 (2006): 321-328.
Li et al.; Electromechanical behavior of PZT-brass unimorphs; J. Am. Ceram. Soc. vol. 82; No. 7; pp. 1733-1740, 1999.
Lipkens et al.; Frequency sweeping and fluid flow effects on particle trajectories in ultrasonic standing waves; Acoustics 08, Paris, Jun. 29-Jul. 4, 2008.
Lipkens et al.; Prediction and measurement of particle velocities in ultrasonic standing waves; J. Acoust. Soc. Am., 124 No. 4, pp. 2492 (A) 2008.
Lipkens et al.; Separation of micron-sized particles in macro-scale cavities by ultrasonic standing waves; Presented at the International Congress on Ultrasonics, Santiago; Jan. 11-17, 2009.
Lipkens et al.; The effect of frequency sweeping and fluid flow on particle trajectories in ultrasonic standing waves; IEEE Sensors Journal, vol. 8, No. 6, pp. 667-677, 2008.
Lipkens et al.; Separation of bacterial spores from flowering water in macro-scale cavities by ultrasonic standing waves; submitted/uploaded to http://arxiv.org/abs/1006.5467 on Jun. 28, 2010.
Lipkens et al., Macro-scale acoustophoretic separation of lipid particles from red blood cells, The Journal of the Acoustical Society of America, vol. 133, Jun. 2, 2013, p. 045017, XP055162509, New York, NY.
Meribout et a.; An Industrial-Prototype Acoustic Array for Real-Time Emulsion Layer Detection in Oil Storage Tanks; IEEE Sensors Journal, vol. 9, No. 12, Dec. 2009.
Nilsson et al.; Review of cell and particle trapping in microfluidic systems; Department of Measurement Technology and Industrial Electrical Engineering, Div. of Nanobiotechnology, Lund University, P.O. Box 118. Lund, Sweden, Analytica Chimica Acta 649, Jul. 14, 2009, pp. 141-157.
Pangu et al.; Droplet transport and coalescence kinetics in emulsions subjected to acoustic fields; Ultrasonics 46, pp. 289-302 (2007).
Ponomarenko et al.; Density of states and zero Landau level probed through capacitance of graphene; Nature Nanotechnology Letters, Jul. 5, 2009; DOI: 10.1038/NNAN0.2009.177.
Ryll et al.; Performance of Small-Scale CHO Perfusion Cultures Using an Acoustic Cell Filtration Device for Cell Retention: Characterization of Separation Efficiency and Impact of Perfusion on Product Quality; Biotechnology and Bioengineering; vol. 69; Iss. 4; pp. 440-449; Aug. 2000.
Seymour et al, J. Chem. Edu., 1990, 67(9), p. 763, published Sep. 1990.
Volpin et al.; Mesh simplification with smooth surface reconstruction; Computer-Aided Design; vol. 30; No. 11; 1998.
Wang et al.; Retention and Viability Characteristics of Mammalian Cells in an Acoustically Driven Polymer Mesh; Biotechnol. Prog. 2004, pp. 384-387 (2004).
Wicklund et al.; Ultrasonic Manipulation of Single Cells; Methods in Molecular Biology; vol. 853; pp. 1777-196; 2012.
Annex to Form PCT/ISA/206—Communication Relating to the Results of the Partial International Search Report, dated Jul. 18, 2013.
European Search Report of European Application No. 11769474.5, dated Sep. 5, 2013.
European Search Report of European Application No. 13760840.2, dated Feb. 4, 2016.
European Search Report of European Application No. 13721179.3 dated Feb. 23, 2016.
International Search Report and Written Opinion dated Dec. 20, 2011, for corresponding PCT application No. PCT/US2011/032181.
International Search Report and Written Opinion dated Feb. 27, 2012, for PCT application No. PCT/US2011/040787.
International Search Report and Written Opinion of International Application No. PCT/US2012/051804 dated Nov. 16, 2012.
International Search Report and Written Opinion of International Application No. PCT/US2013/037404 Dated Jun. 21, 2013.
International Search Report and Written Opinion of International Application No. PCT/US2013/032705 dated Jul. 26, 2013.
International Search Report and Written Opinion of International Application No. PCT/US2013/050729 dated Sep. 25, 2013.
International Search Report dated Feb. 18, 2014 in corresponding PCT Application No. PCT/US2013/059640.
International Search Report for corresponding PCT Application Serial No. PCT/US2014/015382 dated May 6, 2014.
International Search Report for PCT/US2014/035557 dated Aug. 27, 2014.
International Search Report for PCT/US2014/043930 dated Oct. 22, 2014.
International Search Report for PCT/US2014/046412 dated Oct. 27, 2014.
International Search Report for PCT/US2014/064088 dated Jan. 30, 2015.
Extended European Search Report for Application No. EP 12833859.7 dated Mar. 20, 2015.
International Search Report and Written Opinion for International Application No. PCT/US2015/010595 dated Apr. 15, 2015.
International Search Report for PCT/US2015/019755 dated May 4, 2015.
International Search Report dated Jul. 30, 2015 for International Application No. PCT/US2015/030009.
International Search Report for PCT/US2015/039125 dated Sep. 30, 2015.
International Search Report and Written Opinion for PCT Application Serial No. PCT/US2015/053200 dated Dec. 28, 2015.
European Search Report of European Application No. 11796470.0 dated Jan. 5, 2016.
International Search Report and Written Opinion for International Application No. PCT/US2015/066884, dated Mar. 22, 2016.
International Search Report and Written Opinion for International Application No. PCT/US2016/024082 dated Jun. 27, 2016.
International Search Report and Written Opinion for International Application No. PCT/US2016/044586 dated Oct. 21, 2016.
International Search Report and Written Opinion for International Application No. PCT/US2016/031357 dated Jul. 26, 2016.
International Search Report and Written Opinion for International Application No. PCT/US2015/024365 dated Oct. 13, 2016.
International Search Report and Written Opinion for International Application No. PCT/US2016/041664 dated Oct. 18, 2016.
International Search Report and Written Opinion for International Application No. PCT/US2016/049088 dated Nov. 28, 2016.

(56) References Cited

OTHER PUBLICATIONS

International Search Report and Written Opinion for International Application No. PCT/US2016/050415 dated Nov. 28, 2016.
International Search Report and Written Opinion for International Application No. PCT/US2016/037104 dated Dec. 16, 2016.
phys.org. "Engineers develop revolutionary nanotech water desalination membrane." Nov. 6, 2006. http://phys.org/news82047372.html.
"Proceedings of the Acoustics 2012 Nantes Conference," Apr. 23-27, 2012, Nantes, France, pp. 278-282.
Sony New Release: <http://www.sony.net/SonyInfo/News/Press/201010/10-137E/index.html>.

\* cited by examiner

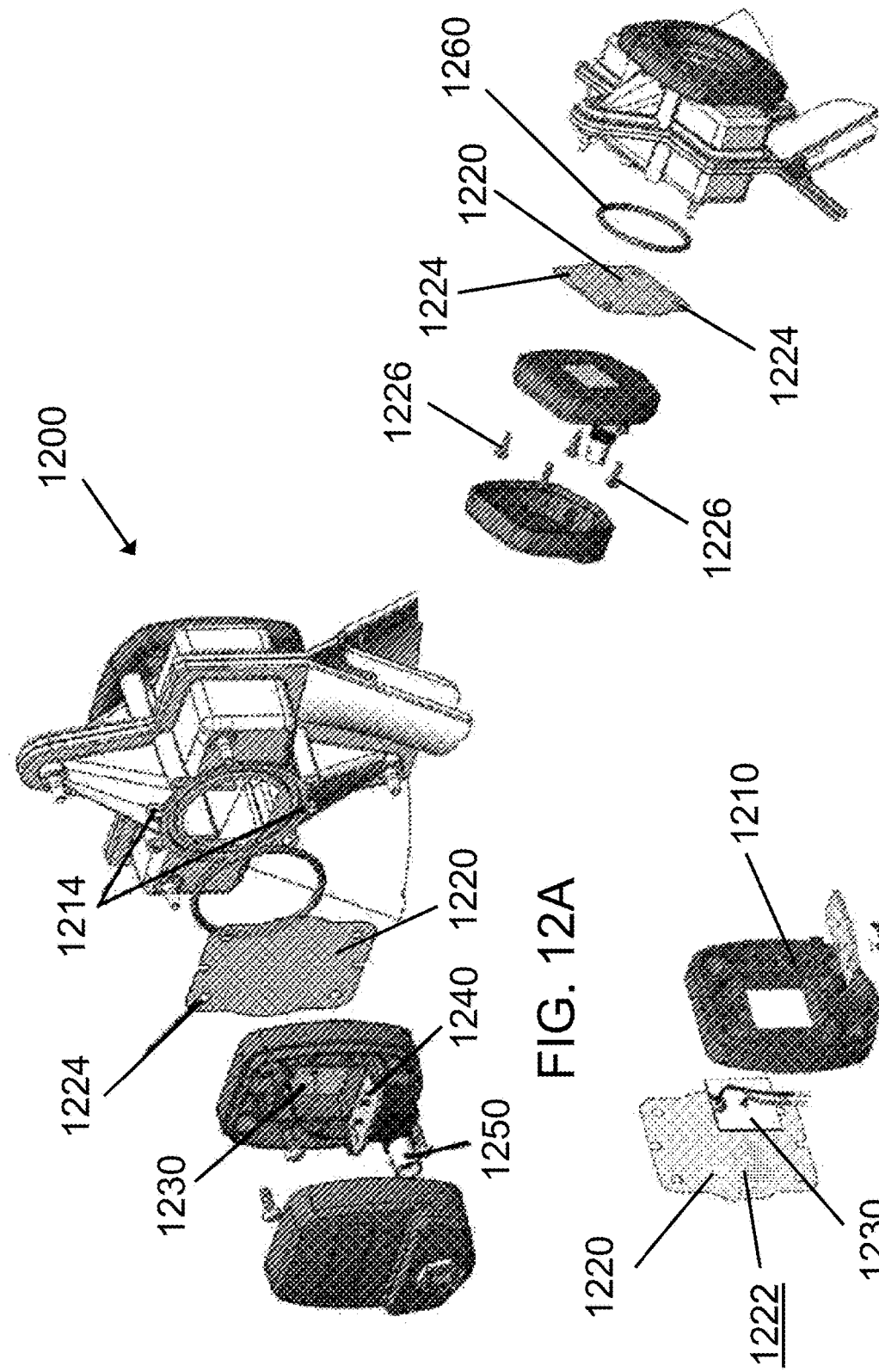

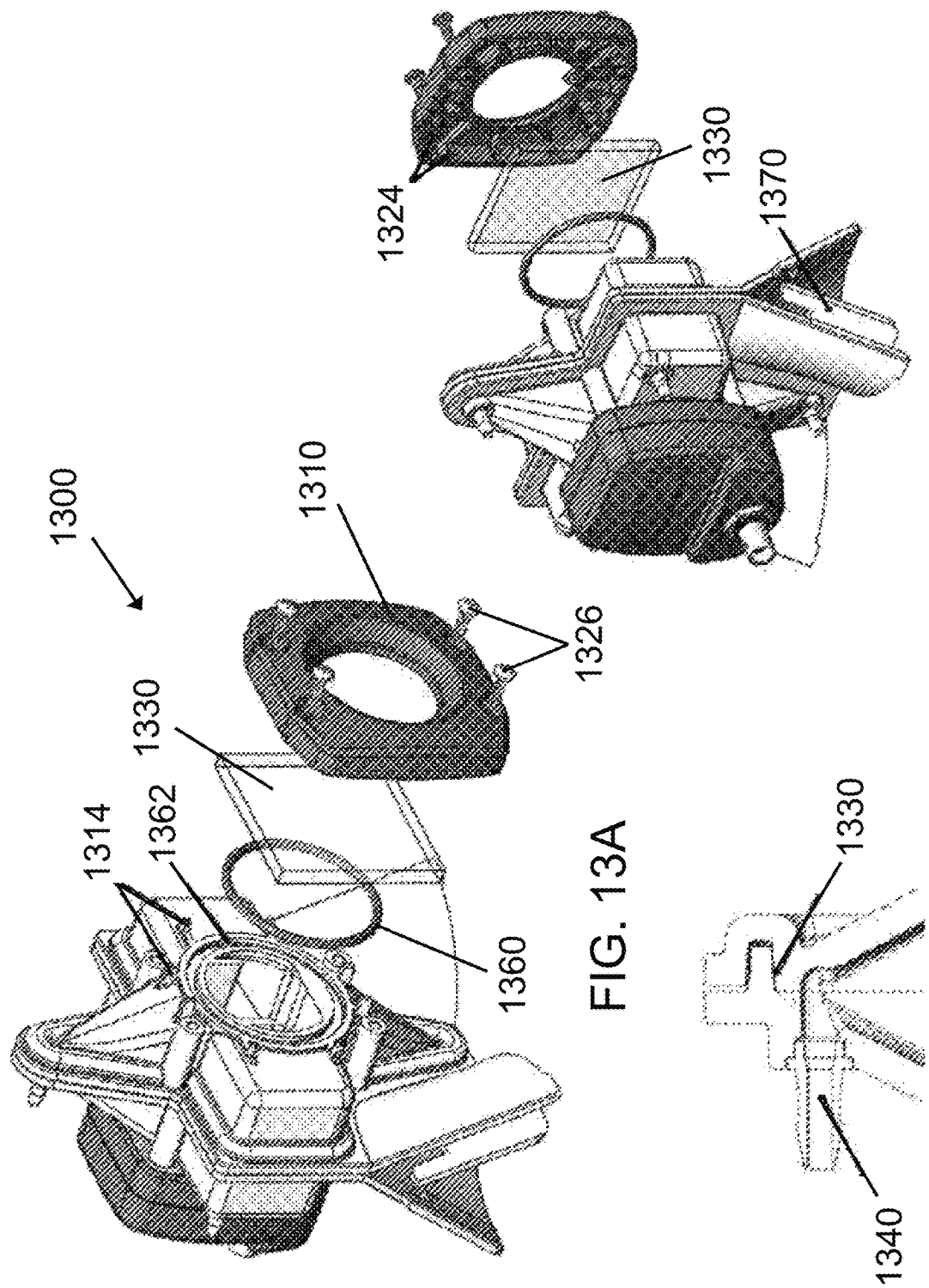

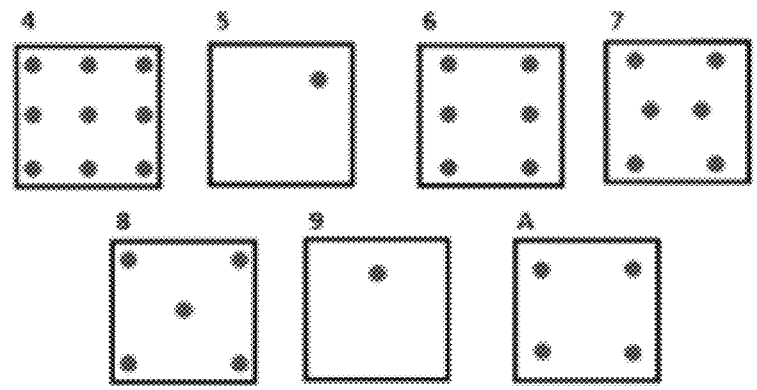
FIG. 15A
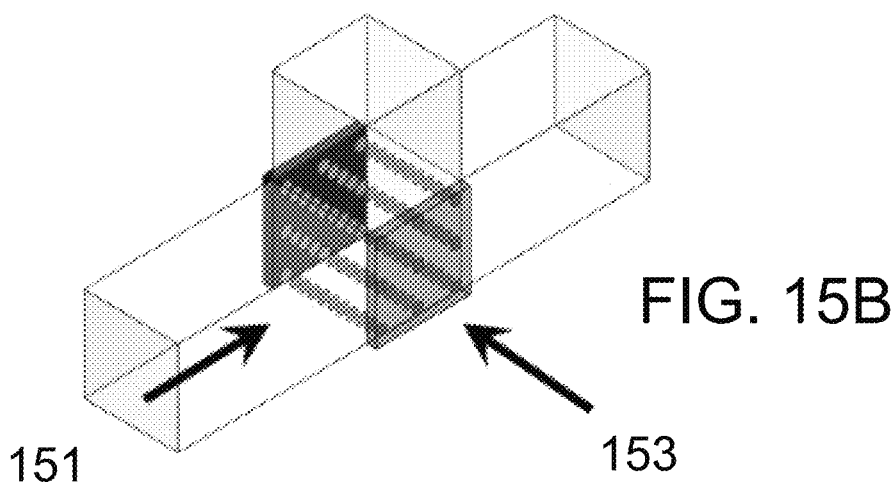
FIG. 15B
151   153
FIG. 15C   FIG. 15D
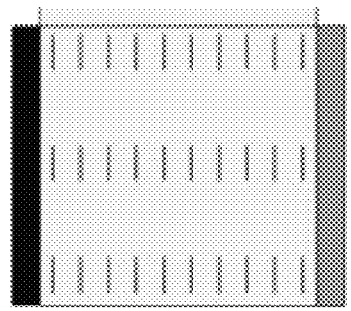 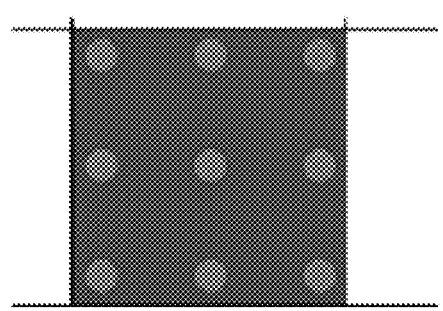

PIEZOELECTRIC TRANSDUCER FOR GENERATION OF AN ACOUSTIC STANDING WAVE

CROSS-REFERENCE TO RELATED APPLICATIONS

This application claims priority to U.S. Provisional Patent Application Ser. No. 62/327,388, filed on Apr. 25, 2016, the disclosure of which is hereby fully incorporated by reference in its entirety.

BACKGROUND

The ability to separate a particle/fluid mixture into its separate components is desirable in many applications. Physical size exclusion filters can be used for this purpose, where the particles are trapped on the filter and the fluid flows through the filter. Examples of physical filters include those that operate by tangential flow filtration, depth flow filtration, hollow fiber filtration, and centrifugation. However, physical filters can be complicated to work with. For instance, as the physical filter fills up, filtration capacity is reduced. Also, using such filters incurs periodic stopping to remove the filter and/or obtain or clear the particles trapped thereon.

Acoustophoresis is the separation of materials using high intensity sound waves. High intensity standing waves of sound can exert forces on materials. An acoustic standing wave has a pressure profile with node and anti-node locations that are relatively stable over time. The pressure profile in an acoustic standing wave contains areas of net zero pressure at its nodes and anti-nodes. Depending on their density and compressibility, materials presented to the acoustic standing wave can be trapped at the nodes or anti-nodes of the standing wave.

BRIEF SUMMARY

The present disclosure relates to ultrasonic transducers that can be used in acoustophoretic systems to separate particles or secondary fluid from a primary fluid. Such systems may be used with bioreactors, such as in a perfusion process, to produce biomolecules such as recombinant proteins or monoclonal antibodies, and to separate these desirable products from a cell culture in the bioreactor. A new mixture with an increased concentration of particles is obtained, or the particles themselves can be obtained or a clarified fluid containing biomolecules, such as recombinant proteins or monoclonal antibodies, may be produced. The ultrasonic transducers of the present disclosure include a piezoelectric material that is adhered on one surface to a polymeric film. The polymeric film is attached to the housing of the transducer, such that the edges of piezoelectric material do not contact the housing. This permits a higher Q-factor to be obtained.

The polymeric film acts as a support for the piezoelectric material and can be, for example, polyetherether ketone (PEEK). The piezoelectric material can be mounted on the polymeric film with an adhesive, such as a pressure sensitive adhesive. The adhesive can, for example, be an acrylic polymer (e.g., 2-ethyl hexyl acrylate). The adhesive can attach the piezoelectric material to the polymeric film in a permanent or reversibly-adherent manner. The polymeric film can, in certain embodiments, be preformed (e.g., die-cut) to a certain shape with a pressure-sensitive adhesive on one side of the polymeric film. The side of the polymeric film having adhesive thereon can define a non-contact side of the polymeric film to which the piezoelectric material is adhered. On the opposite side of the polymeric film, a contact side of the polymeric film can be exposed to a flow chamber of an acoustophoretic device, and contacts the primary fluid. Positive and negative leads to the piezoelectric material can be pre-attached to the piezoelectric material before the piezoelectric material is adhered to the polymeric film. The piezoelectric material adhered to the polymeric film by the adhesive can be incorporated into a transducer housing to form a transducer, which can then be incorporated into an acoustophoretic device/system, such as those previously described.

The driving signal for the transducer may be based on voltage, current, magnetism, electromagnetism, capacitive or any other type of signal to which the transducer is responsive.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 12A is a perspective view of the acoustophoretic device/stage of FIG. 3B illustrating an exploded view of the transducer of the present disclosure.

FIG. 12B is another perspective view of the acoustophoretic device/stage of FIG. 3B illustrating another exploded view of the transducer of the present disclosure.

FIG. 12C illustrates an exploded view of a transducer of the present disclosure. The transducer includes a housing, polymer film, and piezoelectric material.

FIG. 13A is a perspective view of the acoustophoretic device/stage of FIG. 3B illustrating an exploded view of the reflector side of the device/stage.

FIG. 13B is another perspective view of the acoustophoretic device/stage of FIG. 3B illustrating another exploded view of the reflector side of the device/stage.

FIG. 13C illustrates a side view of the connection between a transducer housing and a reflector housing.

FIG. 15A illustrates the trapping line configurations for seven of the peak amplitudes of FIG. 14 from the direction orthogonal to fluid flow.

FIG. 15B is a perspective view illustrating the separator. The fluid flow direction and the trapping lines are shown.

FIG. 15C is a view from the fluid inlet along the fluid flow direction (arrow 151) of FIG. 15B, showing the trapping nodes of the standing wave where particles would be captured.

FIG. 15D is a view taken through the transducers face at the trapping line configurations, along arrow 153 as shown in FIG. 15B.

DETAILED DESCRIPTION

Figure 1:
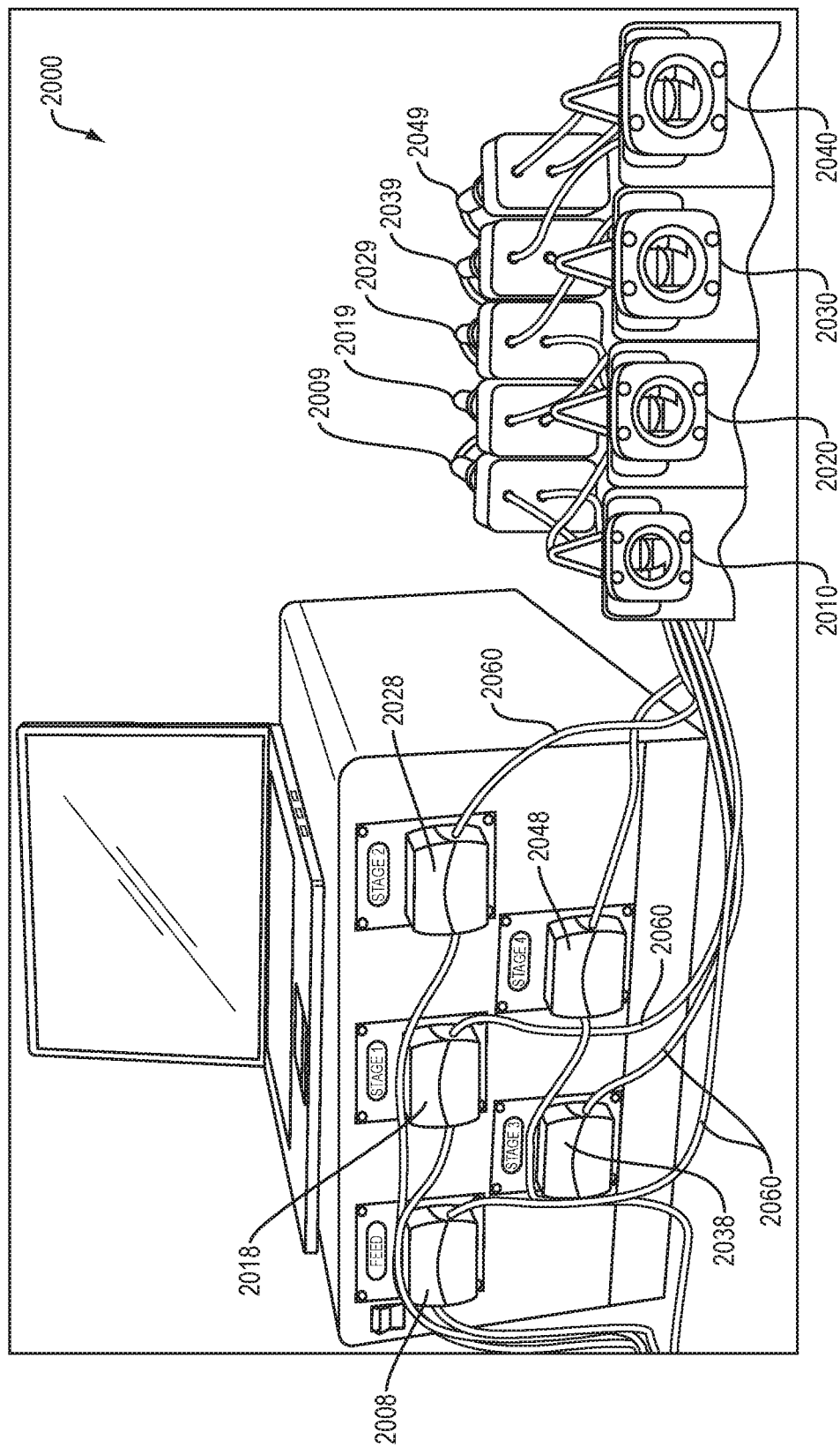
FIG. 1 illustrates an example embodiment of a multi-stage acoustophoretic system according to the present disclosure. The acoustophoretic system includes a total of four acoustophoretic devices/stages fluidly connected to one another by tubing.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer to the particular structure of the embodiments selected for illustration in the drawings, and are not intended to define or limit the scope of the disclosure. In the drawings and the following description below, it is to be understood that like numeric designations refer to components of like function. Furthermore, it should be understood that the drawings are not to scale.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of the named components/steps, along with any impurities that might result therefrom, and excludes other components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. It should be noted that in a loop, a first component can be described as being both upstream of and downstream of a second component.

The terms "horizontal" and "vertical" are used to indicate direction relative to an absolute reference, i.e. ground level. The terms "upwards" and "downwards" are also relative to an absolute reference; an upwards flow is always against the gravity of the earth.

The present application refers to "the same order of magnitude." Two numbers are of the same order of magnitude if the quotient of the larger number divided by the smaller number is a value of at least 1 and less than 10.

The present application also refers to an "acute" angle. For purposes of the present disclosure, the term "acute" refers to an angle between 0° and 90°, exclusive of 0° and 90°.

The acoustophoretic separation technology of the present disclosure employs ultrasonic standing waves to trap, e.g., hold stationary, secondary phase materials, including fluids and/or particles, in a primary fluid stream. The scattering of the acoustic field off the particles results in a three-dimensional acoustic radiation force, which acts as a three-dimensional trapping field. The three-dimensional acoustic radiation force generated in conjunction with an ultrasonic standing wave is referred to in the present disclosure as a three-dimensional or multi-dimensional standing wave. The acoustic radiation force is proportional to the particle volume (e.g. the cube of the radius) when the particle is small relative to the wavelength. It is proportional to frequency and the acoustic contrast factor. It also scales with acoustic energy (e.g. the square of the acoustic pressure amplitude). For harmonic excitation, the sinusoidal spatial variation of the force is what drives the particles to the stable positions within the standing waves. When the acoustic radiation force exerted on the particles is stronger than the combined effect of fluid drag force and buoyancy and gravitational force, the particle can be trapped within the acoustic standing wave field. This trapping results in concentration, agglomeration and/or coalescence of the trapped particles. Additionally, secondary inter-particle forces, such as Bjerkness forces, aid in particle agglomeration. Heavier-than-the-host-fluid (i.e. denser than the host fluid) particles are separated through enhanced gravitational settling.

One specific application for the acoustophoresis device is in the processing of bioreactor materials. It is desirable to filter as much as possible or all of the cells and cell debris from the expressed materials that are in the fluid stream. The expressed materials are composed of biomolecules such as recombinant proteins or monoclonal antibodies, and are the desired product to be recovered. Through the use of acoustophoresis, the separation of the cells and cell debris is very efficient and leads to very little loss of the expressed materials. This separation technique is an improvement over previous or conventional filtration processes (depth filtration, tangential flow filtration, centrifugation), which show limited efficiencies at high cell densities, where the loss of the expressed materials in the filter beds themselves can be up to 5% of the materials produced by the bioreactor. The use of mammalian cell cultures including Chinese hamster ovary (CHO), NS0 hybridoma cells, baby hamster kidney (BHK) cells, and human cells has proven to be a very efficacious way of producing/expressing the recombinant proteins and monoclonal antibodies used in today's pharmaceuticals. The filtration of the mammalian cells and the mammalian cell debris through acoustophoresis aids in greatly increasing the yield of the bioreactor. The acoustophoresis techniques discussed herein permit the cells and/or their expressed materials, to be recovered.

In the acoustophoresis techniques discussed herein, the contrast factor is the difference between the compressibility and density of the particles and the fluid itself. These properties are characteristic of the particles and the fluid themselves. Most cell types present a higher density and lower compressibility than the medium in which they are suspended, so that the acoustic contrast factor between the cells and the medium has a positive value. The axial acoustic radiation force (ARF) drives the cells, with a positive contrast factor, to the pressure nodal planes, whereas cells or other particles with a negative contrast factor are driven to the pressure anti-nodal planes. The radial or lateral component of the acoustic radiation force helps trap the cells. In some examples, radial or lateral components of the ARF are larger than the combined effect of fluid drag force and gravitational force.

As the cells agglomerate at the nodes of the standing wave, there is also a physical scrubbing of the cell culture media that occurs whereby more cells are trapped as they come in contact with the cells that are already held within the standing wave. This phenomenon, or combination of phenomena, contributes to separating the cells from the cell culture media. The expressed biomolecules remain in the nutrient fluid stream (i.e. cell culture medium).

Desirably, the ultrasonic transducer(s) generate a three-dimensional or multi-dimensional acoustic standing wave in the fluid that exerts a lateral force on the suspended particles to accompany the axial force so as to increase the particle trapping capabilities of the acoustophoretic devices. Ultrasonic transducer publications in acoustic related literature provide typical results that indicate that the lateral force in planar or one-dimensional acoustic wave generation is two orders of magnitude smaller than the axial force. In contrast, the technology disclosed in this application provides for a lateral force to be of the same order of magnitude as the axial force.

The multi-dimensional standing wave generates acoustic radiation forces in both the axial direction (i.e., in the direction of the standing wave, between the transducer and the reflector, perpendicular to the flow direction) and the lateral direction (i.e., in the flow direction), which can generate trapping lines, as discussed herein. As the mixture flows through the flow chamber and encounters the acoustic standing wave, particles in suspension experience a strong axial force component in the direction of propagation of the standing wave. The acoustic force is across the flow direction and the drag force, and may be at an angle or perpendicular thereto. The acoustic force quickly moves the particles to pressure nodal planes or anti-nodal planes, depending on the contrast factor of the particle. The lateral acoustic radiation force acts to move the concentrated particles towards the center of each trapping line, resulting in agglomeration or clumping. The lateral acoustic radiation force component can overcome fluid drag for such clumps of particles to permit them to continually grow and drop out of the mixture due to gravity. Therefore, both the drop in drag per particle as the particle cluster increases in size, as well as the drop in acoustic radiation force per particle as the particle cluster grows in size, may be considered in determining the effectiveness of the acoustic separator device. In the present disclosure, the lateral force component and the axial force component of the multi-dimensional acoustic standing wave are of the same order of magnitude. In this regard, it is noted that in a multi-dimensional acoustic standing wave, the axial force is stronger than the lateral force, but the lateral force of a multi-dimensional acoustic standing wave is much higher than the lateral force of a planar standing wave, usually by two orders of magnitude or more.

It is also possible to drive multiple ultrasonic transducers with arbitrary phasing and/or different or variable frequencies. Multiple transducers may work to separate materials in a fluid stream while being out of phase with each other and/or while operating at different or variable frequencies. Alternatively, or in addition, a single ultrasonic transducer that has been divided into an ordered array may also be operated such that some components of the array will be out of phase with other components of the array.

Three-dimensional (3-D) or multi-dimensional acoustic standing waves are generated from one or more piezoelectric transducers, where the transducers are electrically or mechanically excited such that they move in a multi-excitation mode. The types of waves thus generated can be characterized as composite waves, with displacement profiles that are similar to leaky symmetric (also referred to as compressional or extensional) Lamb waves. The waves are leaky because they radiate into the water layer, which result in the generation of the acoustic standing waves in the water layer. Symmetric Lamb waves have displacement profiles that are symmetric with respect to the neutral axis of the piezoelectric element, which causes multiple standing waves to be generated in a 3-D space. Through this manner of wave generation, a higher lateral trapping force is generated than if the piezoelectric transducer is excited in a "piston" mode where a single, planar standing wave is generated. Thus, with the same input power to a piezoelectric transducer, the 3-D or multi-dimensional acoustic standing waves can have a higher lateral trapping force which may be up to and beyond 10 times stronger than a single acoustic standing wave generated in piston mode.

It may be desirable, at times, to modulate parameters of the standing wave, such as frequency or amplitude. The exciting or drive signal applied to the piezoelectric element may be modulated to adjust parameters of the standing wave. For example, the signal may be adjusted by amplitude modulation, such as voltage or current amplitude modulation and/or by frequency modulation. The duty cycle of the propagation of the standing wave may be utilized to achieve certain results for trapping of materials. For example, the acoustic beam may be turned on and shut off at different frequencies to achieve desired results.

In certain applications, multiple acoustophoretic cell filtration devices may be implemented for clarification of a bioreactor cell culture and separation of the biomolecules/proteins from the cells that express them. The present disclosure relates to acoustophoretic systems that are made of modular components, and to kits of such modules. Each module cooperatively engages other modules, and can then be reversibly separated. The kits and modules permit the user to make different configurations of acoustophoretic systems as desired to provide for improved settling and improved separation of particles from fluid. Briefly, particles that are suspended in a host fluid can be subjected to multiple transducers generating multiple standing waves to induce separation from the fluid itself. Improved fluid dynamics can also be provided using the modular components, increasing separation of particles from fluid.

In certain embodiments, the multi-stage acoustophoretic systems described herein can be used with bioreactors, such as in a perfusion process, to produce biomolecules such as recombinant proteins or monoclonal antibodies, and to separate these desirable products from a cell culture in the bioreactor A new mixture with an increased concentration of particles is obtained, or the particles themselves can be obtained or a clarified fluid containing biomolecules, such as recombinant proteins or monoclonal antibodies, may be produced. In more specific embodiments, the particles are biological cells, such as Chinese hamster ovary (CHO) cells, NS0 hybridoma cells, baby hamster kidney (BHK) cells, or human cells; lymphocytes such as T cells (e.g., regulatory T-cells (Tregs), Jurkat T-cells), B cells, or NK cells; their precursors, such as peripheral blood mononuclear cells (PBMCs); algae or other plant cells, bacteria, viruses, or microcarriers. The acoustophoretic systems described herein are scalable and are generally useful for cell densities from about $0.5 \times 10^6$ cells/mL to about $50 \times 10^6$ cells/m L. Several different types of acoustophoretic systems are described herein.

In particular embodiments, the acoustophoretic devices are configured to create multi-dimensional acoustic standing waves all having frequencies within one order of magnitude of each other. In particular embodiments, the acoustophoretic devices are configured to create multi-dimensional acoustic standing waves all having different frequencies than one another. In certain constructions, each multi-dimensional acoustic standing wave results in an acoustic radiation force having an axial force component and a lateral force component that are of the same order of magnitude.

The use of multiple standing waves from multiple ultrasonic transducers allows for multiple separation stages. For example, in a flow path that runs past four ultrasonic stage-reflector pairs (i.e., four acoustophoretic stages), the first stage (and its standing wave) collects a certain amount of the particles, the second stage (and its standing wave) collects particles that passed through and are received from the first stage, the third stage (and its standing wave) collects particles that passed through the first and second stages and are received from the second stage, and the fourth stage (and its standing wave) collects particles that passed through the first, second, and third stages, and are received from the third stage. This construction can be useful where the particle/fluid ratio is high (i.e. large volume of particles), and the separation capacity of any upstream transducers is reached. This construction can also be useful for particles that have a bimodal or greater size distribution, where each transducer can be implemented to capture particles within a certain size range.

Figure 2:
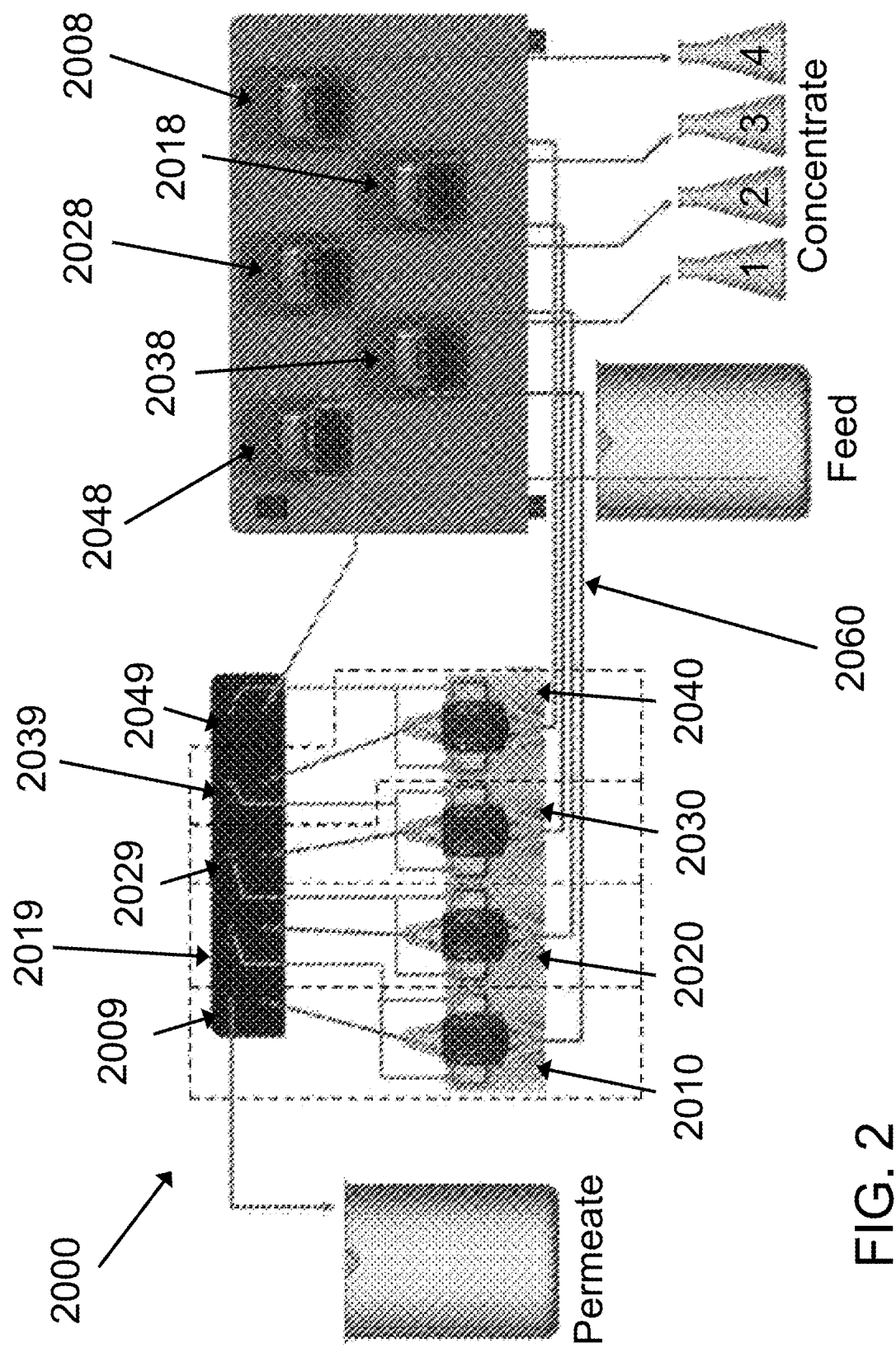
FIG. 2 schematically illustrates the multi-stage acoustophoretic system of FIG. 1 showing the tubing connecting the acoustophoretic devices/stages to one another and to the flow meters, feed, permeate, and concentrate reservoirs.

FIG. 1 and FIG. 2 illustrate a first example embodiment of a multi-stage acoustophoretic system 2000. System 2000 includes a first acoustophoretic device 2010, a second acoustophoretic device 2020, a third acoustophoretic device 2030, and a fourth acoustophoretic device 2040. Each acoustophoretic device 2010, 2020, 2030, 2040 can be considered a different and/or distinct acoustophoretic or filtration stage. System 2000 is a four-stage acoustophoretic system. Each acoustophoretic device 2010, 2020, 2030, 2040 can be constructed as described herein to include an acoustic chamber and at least one acoustic transducer. The transducer can be actuated to generate an acoustic standing wave, such as at least one multi-dimensional acoustic standing wave. The acoustic chambers of each acoustophoretic device 2010, 2020, 2030, 2040 can, in certain embodiments, have an area of 1 inch×2 inches. The nominal flow rate through the system can be about 4 L/hour, such as about 3.64 L/hour or about 60 mL/min, for example.

In the system 2000 depicted in FIG. 1 and FIG. 2, the devices 2010, 2020, 2030, 2040 are connected to each other in series, with each device/stage being connected to serially adjacent upstream/downstream stages by tubing 2060 running therebetween. Attaching serially adjacent stages to one another using tubing (as opposed to directly connecting the device of each stage to serially adjacent devices) provides for better separation of fluid and particulate.

Pumps (e.g., peristaltic pumps) may be provided between each device, and additional pumps can be provided upstream of the first device and downstream of the last device. In this regard, it is noted that in the four-stage system 2000 depicted in FIG. 1 and FIG. 2, five pumps are present for the four devices/stages: (1) a feed pump 2008 upstream of the first acoustophoretic device 2010; (2) a first pump 2018 downstream of the first acoustophoretic device 2010 and upstream of the second acoustophoretic device 2020; (3) a second pump 2028 downstream of the second acoustophoretic device 2020 and upstream of the third acoustophoretic device 2030; (4) a third pump 2038 downstream of the third acoustophoretic device 2030 and upstream of the fourth acoustophoretic device 2040; and (5) a fourth pump 2048 downstream of the fourth acoustophoretic device 2040. Put more simply, the embodiment of system 2000 depicted in FIG. 1 and FIG. 2 includes a feed pump 2008 upstream of the first acoustophoretic device 2010 and a pump 2018, 2028, 2038, 2048 downstream of each acoustophoretic device 2010, 2020, 2030, 2040, respectively. The pumps 2008, 2018, 2028, 2038, 2048 are fluidly connected between respective serially adjacent devices/stages by tubing 2060.

In addition to pumps, the embodiment of system 2000 depicted in FIG. 1 and FIG. 2 includes flowmeters connected to each pump. As illustrated here, five flowmeters are present: (1) a first flowmeter 2009 upstream of the first acoustophoretic device 2010; (2) a second flowmeter 2019 downstream of the first acoustophoretic device 2010 and upstream of the second acoustophoretic device 2020; (3) a third flowmeter 2029 downstream of the second acoustophoretic device 2020 and upstream of the third acoustophoretic device 2030; (4) a fourth flowmeter 2039 downstream of the third acoustophoretic device 2030 and upstream of the fourth acoustophoretic device 2040; and (5) a fifth flowmeter 2049 downstream of the fourth acoustophoretic device 2040. Put more simply, the embodiment of system 2000 depicted in FIG. 1 and FIG. 2 includes a feed flowmeter 2009 upstream of the first acoustophoretic device 2010 and flowmeters 2019, 2029, 2039, 2049 downstream of each acoustophoretic device 2010, 2020, 2030, 2040, respectively. As with the pumps, the flowmeters 2009, 2019, 2029, 2039, 2049 are fluidly connected between respective adjacent devices/stages by tubing 2060. Thus, fluid flow is through a feed pump, then a flowmeter, then the first acoustophoretic/filtration stage, then a pump, then a flowmeter, etc., ending with a final pump and a flowmeter.

Figure 3:
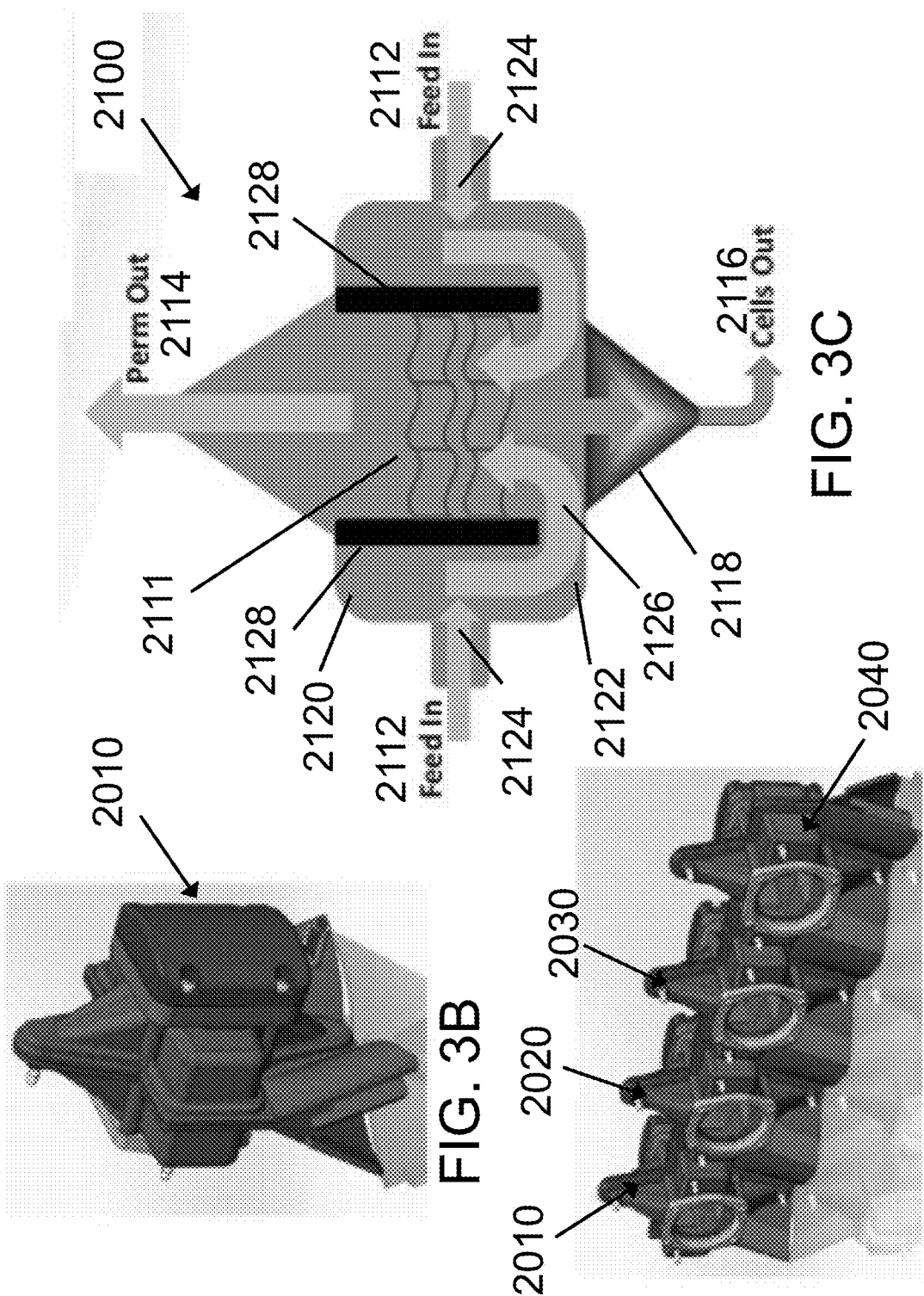
FIG. 3A illustrates an example embodiment of four acoustophoretic devices/stages physically connected to one another for use in a multi-stage acoustophoretic system according to the present disclosure.
FIG. 3B illustrates an isolated view of one of the acoustophoretic devices/stages of FIG. 3A.
FIG. 3C is a cross-sectional diagram of one of the acoustophoretic devices/stages of FIG. 3A. The device includes opposing flow dump diffuser inlets generating flow symmetry and more uniform velocities.

In some embodiments, such as that depicted in FIG. 3A, the individual device stages 2010, 2020, 2030, 2040 are physically located side-by-side, and are physically fastened to each other. However, being physically fastened to each other is not required—the device stages 2010, 2020, 2030, 2040 can be separated from each other, and be fluidly connected by tubing, such as depicted in FIG. 1 and FIG. 2. FIG. 3B is a rear view of the first acoustophoretic stage 2010.

FIG. 3C shows a cross-sectional diagram of an example acoustophoretic device/stage 2100, which can be used as any of the devices/stages of the multi-stage acoustophoretic systems described herein. This device 2100 can improve fluid management at low particle Reynolds numbers, and create a more uniform flow through the device. The device 2100 has upward, vertical flow through the acoustic chamber 2111. The acoustic chamber also has two opposing dump diffusers 2112 and a collector design which provides a vertical plane or line of flow symmetry. Generally, the cross-section of the device in the flow direction is circular or rectangular. In this example, the acoustic chamber is empty (in the absence of fluid), e.g., there are no other structures in the chamber between the transducer and the reflector, and fluid is permitted to flow through the acoustic chamber. At least one permeate outlet 2114 is present at the upper end of the acoustic chamber. At least one concentrate outlet 2116 is present at the lower end of the acoustic chamber. A shallow wall 2118 is present at the lower end of the acoustic chamber, and leads to the concentrate outlet 2116. The shallow wall is angled relative to a horizontal plane, which may be described by the bottom of the acoustic chamber. At least one ultrasonic transducer (not shown) is coupled to the acoustic chamber, and may be located, for example, on a sidewall of the acoustic chamber. At least one reflector (not shown), or another ultrasonic transducer, is positioned opposite the ultrasonic transducer, and may be located, for example, on the sidewall opposite the ultrasonic transducer. The multidimensional standing wave may be generated using a transducer and an opposing reflector, or may be generated using two opposing transducers.

This device 2110 includes a symmetrical, dual dump diffuser, plenum inlet configuration. Here, two dump diffusers 2112 are placed on opposite sides of the device. Each dump diffuser has a plenum/chamber with an upper end 2120 and a lower end 2122. The plenum volume provides flow diffusion and dramatically reduces incoming flow non-uniformities. An inlet flow port 2124 is located above the lower end 2122, and at least one flow outlet 2126 is located at the lower end of the plenum. A solid wall 2128 is present at the upper end of the plenum. These dump diffuser flow outlets can be in the form of slots or a line of holes, and they are placed above the bottom of the acoustic chamber. The diffusers 2112 provide a flow direction through the acoustic chamber that is at an angle, such as normal, to the axial direction of the acoustic standing waves generated by the ultrasonic transducer. The acoustic chamber inlets are also arranged so that they are in opposing locations, so that the horizontal velocity decreases toward zero in the center of the acoustic chamber.

The dump diffusers contribute to reducing or eliminating downward flow of the fluid mixture in the acoustic chamber. The fluid mixture fills up the plenum in the dump diffuser and then flows horizontally into the acoustic chamber, where the mixture flows vertically upwards past the acoustic standing waves. The dump diffuser reduces/eliminates flow pulsations and flow non-uniformities that result from pumps, hosing and/or horizontal inlet flow where gravity effects dominate. The dump diffuser brings the mixture into the acoustic chamber below the ultrasonic transducer, and thus below the nodal clusters or lines that form in the ultrasonic standing waves. This arrangement helps to reduce or minimize any disturbances of the clusters that might otherwise be caused by inflowing material.

The vertical plane or line of symmetry is aligned with gravity forces. Also shown are flow streamlines which are desirably symmetrical to reduce or minimize non-uniformities, eddy disturbances, circulation, and disturbance of clusters falling through the concentrate outlet 2116 to be collected. Symmetry also contributes to even distribution of gravity forces in the inlet flow distribution and particle collection process. Because it is heavier than the permeate exiting at the top of the device, the (relatively) heavy incoming mixture comes in near the bottom of the acoustic chamber, spreads out across the bottom of the chamber due to gravity forces, and provides near uniform velocity profiles from bottom to top. The horizontal velocity of the mixture may decrease to approach or equal zero as the mixture nears the center of the acoustic chamber due to the dual opposing inlet flows. This reduction in horizontal velocity contributes to reduced or minimized interference between the chamber flow and dropping particle clusters. A uniform velocity enhances and may maximize separation and collection results. The lateral acoustic forces of the acoustic standing wave can overcome particle drag and permit the particles to be trapped to form clusters and to grow and be continuously removed from the acoustic standing wave. The uniform velocity can aid in avoiding uneven disturbances or interference with the lateral acoustic forces. The uniform velocity permits an inlet flow distributor to be optional.

As the particle clusters drop out, the axial acoustic forces associated with the standing wave contribute to keeping the clusters intact. Keeping the clusters intact can help to maintain rapid dropping of the clusters with high terminal velocities, on the order of 1 cm/sec. The dropping velocity of the clusters can be extremely fast compared to the chamber flow velocities, which may be on the order of 0.1 cm/sec to 0.3 cm/sec in some examples. The shallow wall angle means the particle clusters, which may have a cylindrical shape, can travel a relatively short distance before they exit the acoustic chamber, so that little dispersion of the clusters occurs. Preferably, the system operates with 3 to 12 crystal vibration nodes per square inch of transducer. The symmetry, reduced flow disturbance in the central collection region, and shallow collector walls obtain improved collection, and may permit baffles/laminar plates to be optional.

Figure 4:
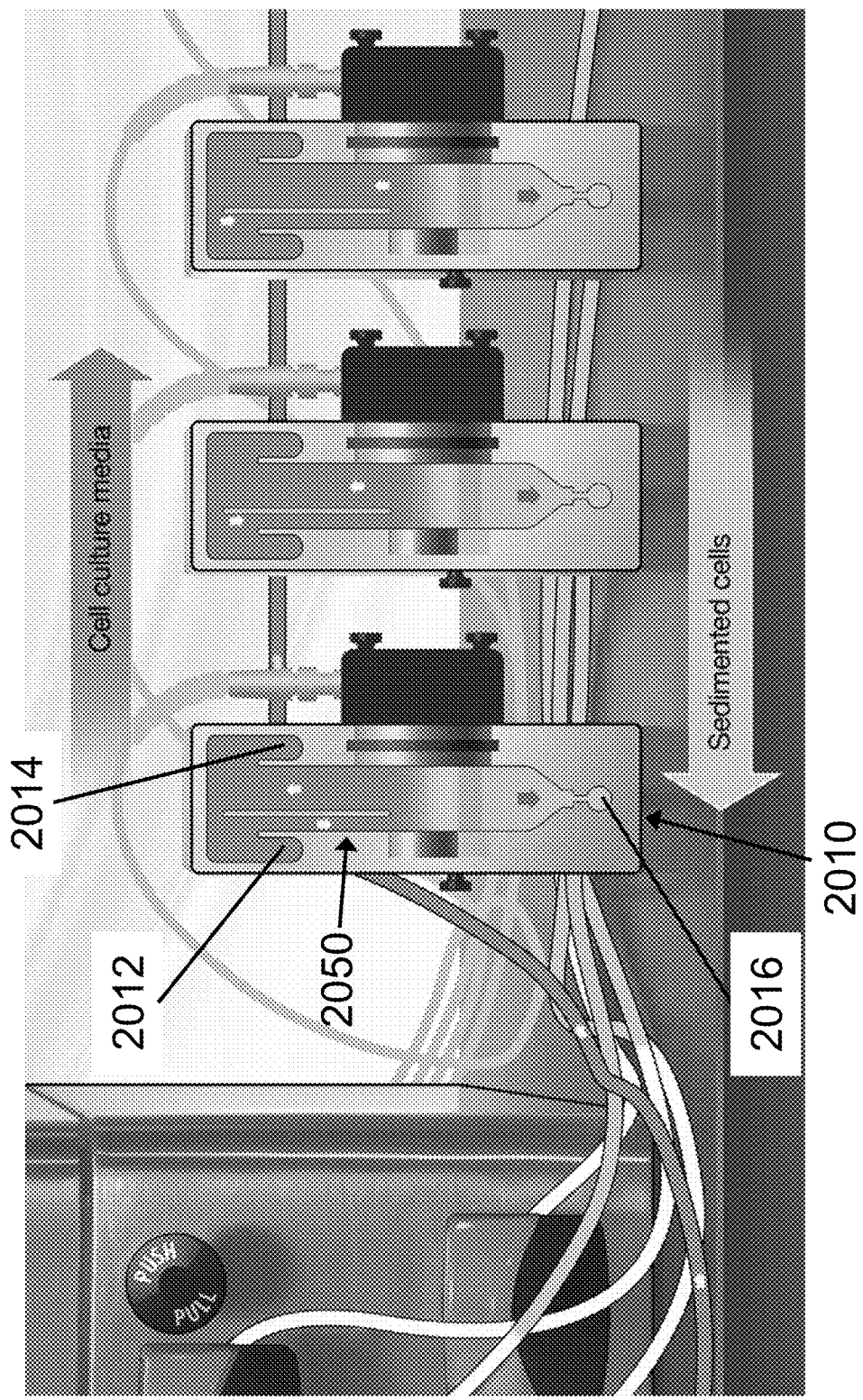
FIG. 4 illustrates three of the four acoustophoretic devices of the four-stage acoustophoretic system of FIG. 1. The acoustophoretic devices are connected to one another and to pumps via tubing running therebetween. The figure also shows fluid entrained with cell culture media being continuously flowed into each device via an inlet thereof while sedimented/agglomerated cells fall/settle out of each device via a port thereof, and an outlet for the egress of residual fluid from the device to a subsequent device.

FIG. 4 is a diagram that generally illustrates the fluid flow path through an acoustophoretic stage 2010. Fresh fluid/cell culture media mixture is continuously introduced to the stage via an inlet 2012 at a top end thereof, and flows through the flow chamber 2050. Within the flow chamber, cells are agglomerated and fall/settle out of the acoustic standing waves. These sedimented cell agglomerates/aggregates then fall to the bottom of the flow chamber 2050 and can be recovered via port 2016. The residual mixture flows out of the flow chamber through an outlet 2014 at a top end of the device and continues on to downstream devices, as described herein.

Figure 5:
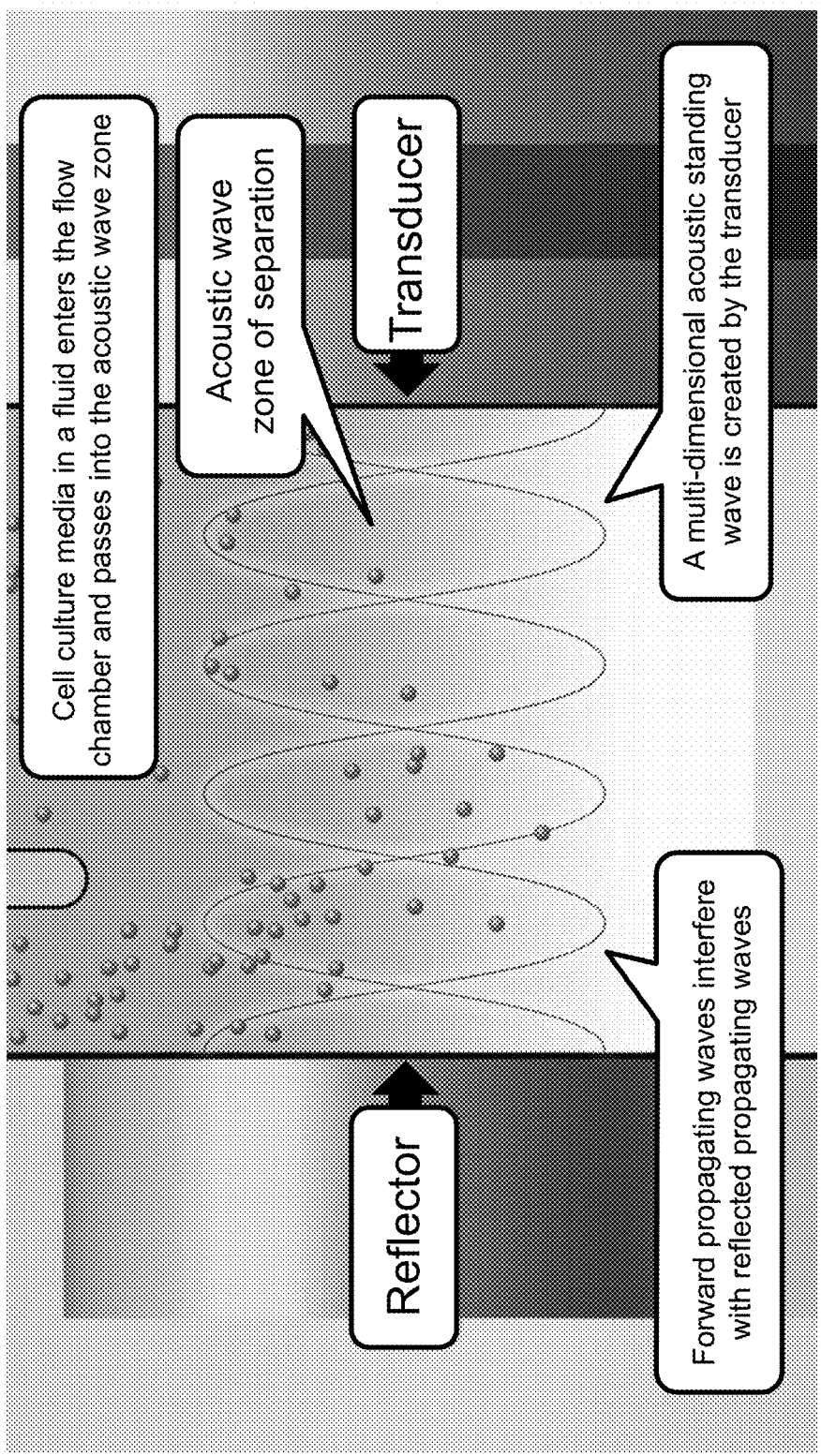
FIG. 5 is a magnified side cross-sectional view illustrating cell culture media in a fluid flowing vertically downward through the flow chamber and passing into the acoustic wave zone of separation.
Figure 6:
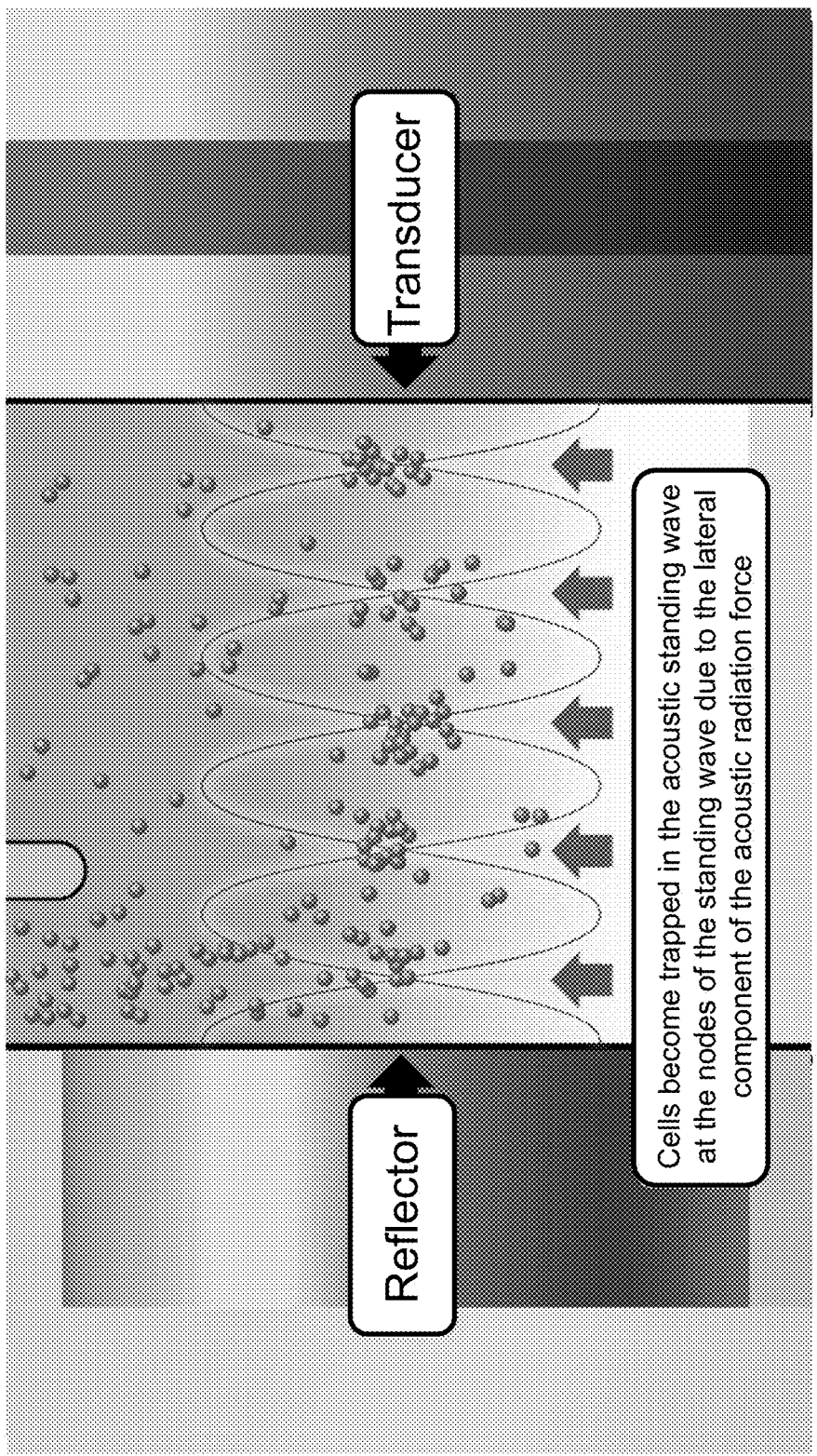
FIG. 6 is a continuation of FIG. 5, showing the cells in the fluid becoming trapped in the acoustic standing wave at the nodes of the pressure standing wave due to the lateral component of the acoustic radiation force.
Figure 7:
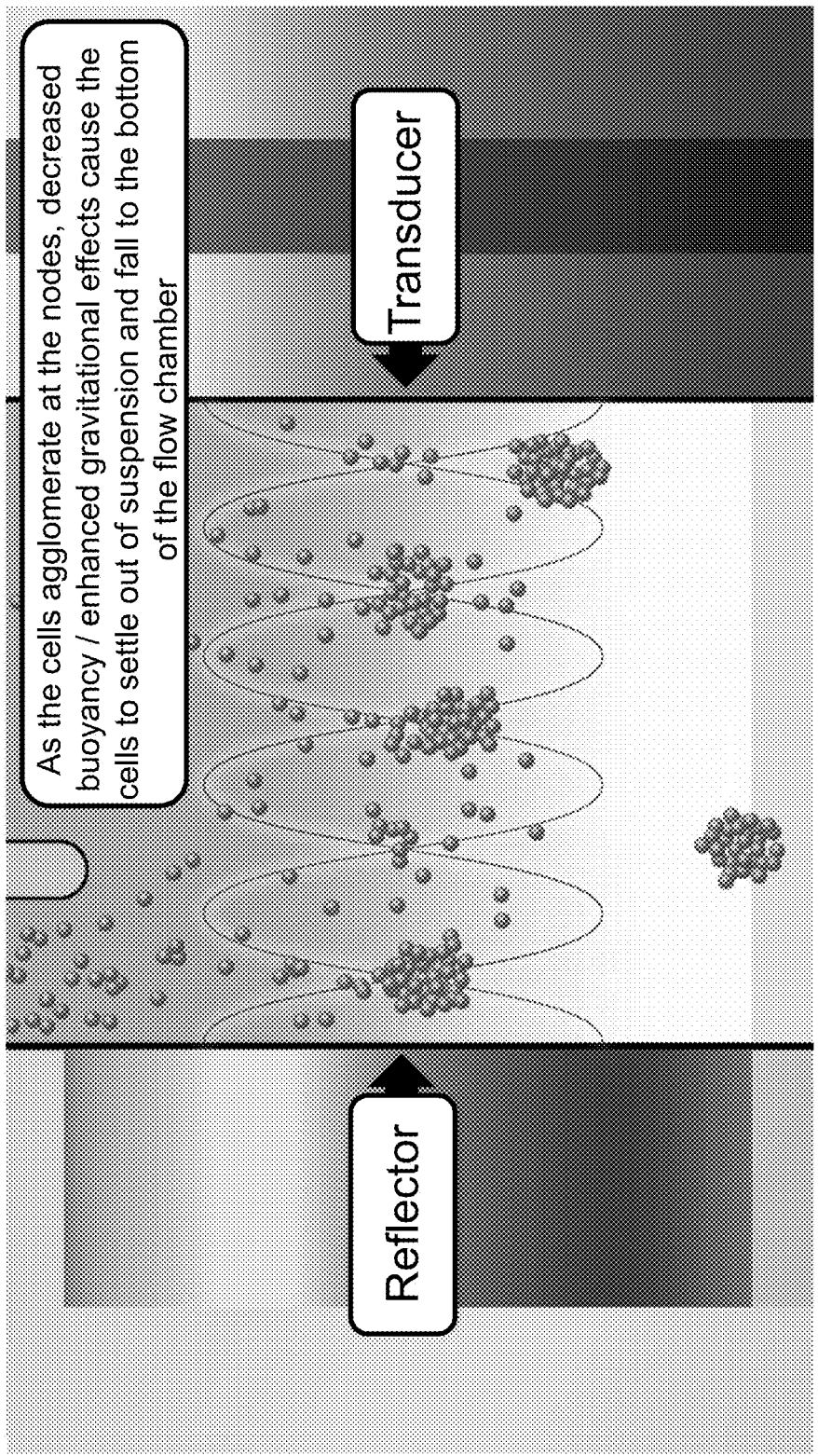
FIG. 7 is a continuation of FIG. 6, showing the cells trapped in the acoustic standing wave agglomerating to form clusters of cells that settle out of suspension and fall to the bottom of the flow chamber due to decreased buoyancy/enhanced gravitational effects.

FIGS. 5-7 illustrate the functioning of an acoustophoretic stage. As shown in FIG. 5, a fluid/cell culture media mixture enters the acoustophoretic stage via tubing and passes into an acoustic wave zone of separation, i.e. the area in which the at least one multi-dimensional acoustic standing wave is created. This acoustic wave zone is defined between the ultrasonic transducer and the reflector. As depicted in FIG. 6, due to the effect of the lateral component of the acoustic radiation force, the cells become trapped in the acoustic standing wave at the nodes thereof. As depicted in FIG. 7, as the cells agglomerate at the nodes, a reduction in acoustic radiation force and/or decreased buoyancy/enhanced gravitational effects cause the agglomerated cells to settle out of suspension and fall to the bottom of the flow chamber.

The various parts of the multi-stage acoustophoretic system described herein, such as the flow chamber, can be made from any suitable material that can house a fluid mixture. Such suitable materials for the flow chamber and associated parts include medical grade plastics, such as polycarbonates or polymethyl methacrylates, or other acrylates. One specifically contemplated material for the flow chamber/housing of the multi-stage acoustophoretic systems described herein is polyphenylsulfone (PPS). The material may be configured to be at least somewhat transparent as a clear window to permit the internal flow channels and flow paths to be seen during operation of the acoustophoresis device/system.

The multi-dimensional acoustic standing wave used for particle collection is obtained by driving an ultrasonic transducer at a frequency that both generates the acoustic standing wave and excites a fundamental 3D vibration mode of the piezoelectric material of the transducer. Perturbation of the piezoelectric material in an ultrasonic transducer in a multimode fashion allows for generation of a multidimensional acoustic standing wave. A piezoelectric material can be specifically designed to deform in a multimode fashion at designated frequencies, allowing for generation of a multi-dimensional acoustic standing wave. The multi-dimensional acoustic standing wave may be generated by distinct modes of the piezoelectric material such as a 3×3 mode that would generate multidimensional acoustic standing waves. A multitude of multidimensional acoustic standing waves may also be generated by allowing the piezoelectric material to vibrate through many different mode shapes. Thus, the piezoelectric material can be excited to generate multiple modes such as a 0×0 mode (i.e. a piston mode) to a 1×1, 2×2, 1×3, 3×1, 3×3, and other higher order modes and then cycle back through the lower modes of the piezoelectric material (not necessarily in straight order). This switching or dithering of the piezoelectric material between modes allows for various multidimensional wave shapes, along with a single piston mode shape to be generated over a designated time.

The present disclosure specifically relates to ultrasonic transducer structures that can be used in the devices, systems, and methods of the present disclosure. Generally, the transducers use a piezoelectric material, which can be a ceramic material, a crystal or a polycrystal, such as PZT-8 (lead zirconate titanate). Such crystals may have a 1 inch diameter and a nominal 2 MHz resonance frequency. Each ultrasonic transducer module can have one piezoelectric material, or can have multiple piezoelectric materials. The multiple piezoelectric materials can each act as a separate ultrasonic transducer and may be controlled by one or multiple controllers, drivers or amplifiers.

Very generally, ultrasonic transducers including a piezoelectric material are utilized to generate acoustic standing waves in fluid through the input of an electronic signal (e.g., based on voltage, current, magnetism, electromagnetism, capacitive or any other type of signal to which the transducer is responsive) at a certain frequency or frequencies, with or without amplification of the electronic signal, such that the piezoelectric material will expand and contract in the direction that the piezoelectric material is polled. It is desirable to obtain as high an efficiency factor (known as the Q-factor) as possible for the conversion of the electrical impulse to the mechanical movement in the piezoelectric material. Minimizing the dampening of the piezoelectric material aids in obtaining a high Q-factor.

Figure 8:
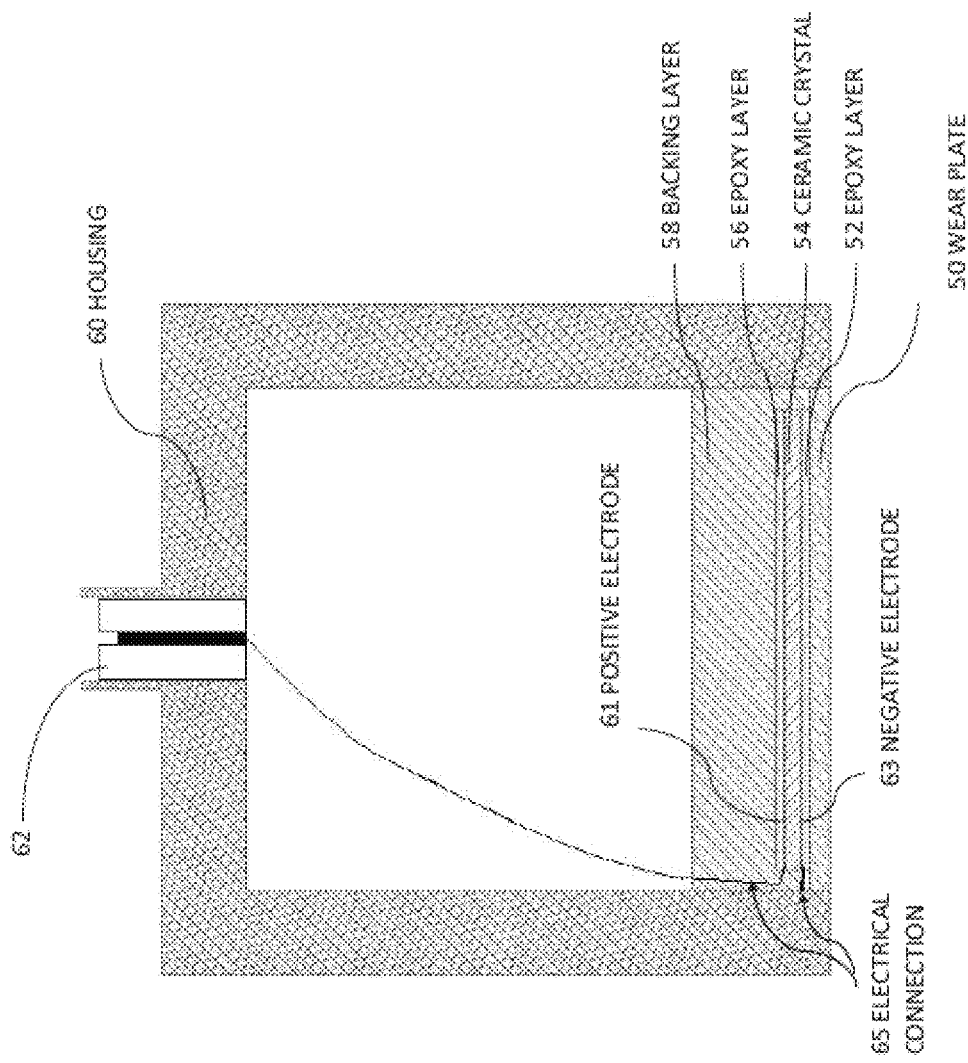
FIG. 8 is a cross-sectional diagram of a conventional ultrasonic transducer.

Prior to describing the new ultrasonic transducers, it may be helpful to describe conventional ultrasonic transducer structures. FIG. 8 is a cross-sectional diagram of a conventional ultrasonic transducer. This transducer has a wear plate 50 at a bottom end, epoxy layer 52, piezoelectric crystal 54 (made of, e.g. PZT), an epoxy layer 56, and a backing layer 58. On either side of the piezoelectric crystal, there is an electrode: a positive electrode 61 and a negative electrode 63. The epoxy layer 56 attaches backing layer 58 to the crystal 54. The entire assembly is contained in a housing 60 which may be made out of, for example, aluminum. An electrical adapter 62 provides a connection for wires to pass through the housing and connect to leads (not shown) which attach to the crystal 54. Typically, backing layers are designed to add damping and to create a broadband transducer with uniform displacement across a wide range of frequency and are designed to suppress excitation at particular vibrational eigen-modes. Wear plates are usually designed as impedance transformers to better match the characteristic impedance of the medium into which the transducer radiates. As shown in FIG. 8, many conventional piezoelectric transducers utilize a stiff material, such as an epoxy polymer (shown here in the form of epoxy layers 52, 56) on both surfaces of the piezoelectric material 54 to secure the piezoelectric material to both the wear plate 50 and the backing layer 58 and fix the piezoelectric material in place within the transducer. The backing layer also surrounds the edges of the piezoelectric material. This arrangement diminishes the Q-factor of the piezoelectric transducer due to the dampening on both the interior surface and the edges of the piezoelectric material.

Figure 9:
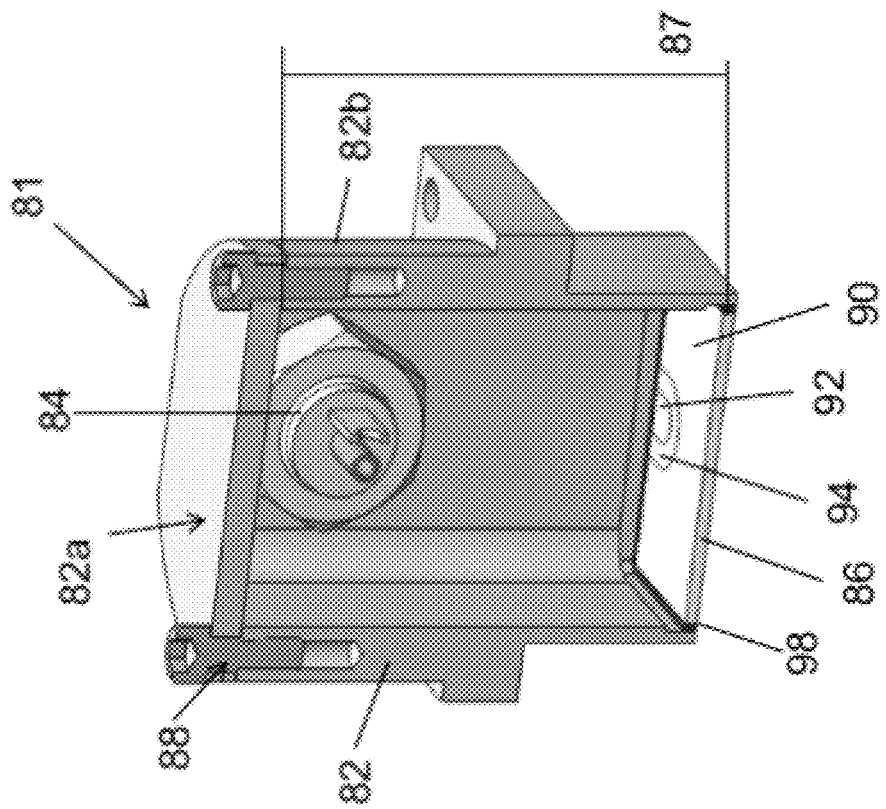
FIG. 9 is a cross-sectional diagram of another conventional ultrasonic transducer.

FIG. 9 is a cross-sectional view of another conventional ultrasonic transducer 81. Transducer 81 is shaped as a disc or a plate, and has an aluminum housing 82. The aluminum housing has a top end and a bottom end. The transducer housing may also be composed of plastics, such as medical grade HDPE or other metals. The piezoelectric element is a mass of perovskite ceramic, each consisting of a small, tetravalent metal ion, usually titanium or zirconium, in a lattice of larger, divalent metal ions, usually lead or barium, and $O^{2-}$ ions. As an example, a PZT (lead zirconate titanate) piezoelectric element 86 defines the bottom end of the transducer, and is exposed from the exterior of the bottom end of the housing. The piezoelectric element is supported on its perimeter by a small elastic layer 98, e.g. epoxy, silicone or similar material, located between the piezoelectric element and the housing. The piezoelectric element/crystal has an exterior surface (which is exposed) and an interior surface as well.

Figure 10:
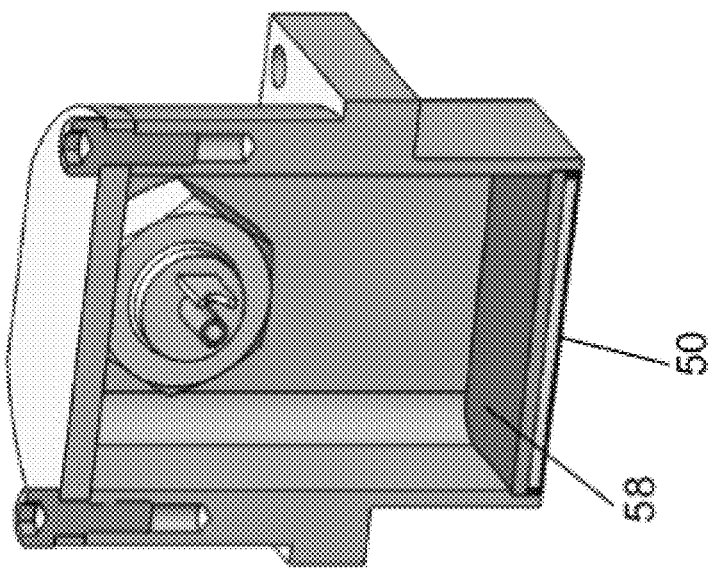
FIG. 10 is a cross-sectional diagram of another conventional ultrasonic transducer.

Screws attach an aluminum top plate 82*a* of the housing to the body 82*b* of the housing via threads 88. The top plate includes a connector 84 for powering the transducer. The top surface of the PZT piezoelectric element 86 is connected to a positive electrode 90 and a negative electrode 92, which are separated by an insulating material 94. The polarities of electrodes 90, 92 can be reversed, and electrodes 90, 92 can be located on opposing sides or the same side of piezoelectric element 86, where the same side can be an interior surface or an exterior surface. The electrodes can be made from any conductive material, such as silver or nickel. Electrical power is provided to the PZT piezoelectric element 86 through the electrodes on the piezoelectric element. Note that the piezoelectric element 86 has no backing layer or epoxy layer. Transducer 81 has an interior volume or an air gap 87 in the transducer between aluminum top plate 82*a* and the piezoelectric element 86 (e.g., the housing is empty or contains atmospheric air). A minimal backing 58 (on the interior surface) and/or wear plate 50 (on the exterior surface) may be provided in some embodiments, as seen in FIG. 10.

The ultrasonic transducers of the present disclosure are now illustrated with reference to an acoustophoretic device as disclosed in FIGS. 1-3C. FIGS. 12A-12C provide exploded views of the various parts of the acoustophoretic device 1200.

Referring first to FIG. 12C, the transducer assembly 1201 generally includes a housing 1210 that supports a piezoelectric material 1230. The housing can be described as including a frame that surrounds the piezoelectric material. The piezoelectric material is illustrated as having a square shape, with an interior surface and an exterior surface, and four edges. Electrodes 1231, 1233 are attached to the interior surface of the piezoelectric material.

The exterior surface of the piezoelectric material is attached to a polymeric film 1220 by a layer of adhesive 1222. The polymeric film 1220 acts as a support for the piezoelectric material 1230 and can be made from a polymer, for example, polyetherether ketone (PEEK), or any suitable material that is acoustically transparent, or other suitable material that can act as a barrier between the transducer and the fluid in the flow chamber.

The piezoelectric material 1230 can be mounted on the polymeric film 1220 with any suitable adhesive 1222, such as a pressure sensitive adhesive. The adhesive can be, for example, an acrylic polymer (e.g., polymerized 2-ethyl hexyl acrylate). The adhesive 1222 can provide various degrees of adhesion to attach the piezoelectric material 1230 to the polymer film 1220. The adhesive 1222 can be reversibly-adherent. The piezoelectric material 1230 may have little or minimal contact with, or be spaced from, the housing 1210 of the transducer assembly 1200. The piezoelectric material 1230 can be supported by the polymer film 1220 and substantially free-floating (e.g., with little or minimal edge confinement) with respect to the housing 1210. The electrical input to the piezoelectric material 1230 may be transferred into mechanical movement at a high rate of efficiency, or have a high Q-factor. The high Q-factor may lead to better trapping of particles in a fluid stream when one or more multi-dimensional acoustic standing wave(s) are produced by the transducer.

In some embodiments, the transducer can be free-floating, as described elsewhere herein, and be provided with additional rigid or flexible structure that connect the transducer to the housing, for example. The additional structures may contribute to enhancing certain modes of transducer operation while permitting a high Q-factor to be achieved. In such a case, a polymeric film may cover the transducer face to implement a barrier between the transducer and the fluid. The polymeric film can be specified to provide good barrier characteristics rather than good transducer support characteristics, with the additional structures providing support for the transducer.

In some examples, the polymeric film may be a wall of a bag to which the transducer is applied. The transducer may be adhered to the wall of the bag in the same way as discussed elsewhere herein with respect to adhesively attaching the transducer to the polymeric film. In such implementations, the bag may be an open container or closed container. For example, the bag can be configured with an inlet and outlet for flowing fluid through the bag. The bag can be a closed container, for example by having one or more passages that are sealable to prevent fluid flow. A reflector or another transducer may be applied to a bag wall that is opposite the transducer to reflect or generate acoustic energy. The bag may be a single use container that houses a fluid mixture, which is separated using an acoustic standing wave as discussed elsewhere herein. The transducer may be applied to the bag to perform separation, after which the transducer may be removed, leaving the bag intact and useable for further processes/processing.

Removing the backing (e.g. making the piezoelectric element air backed) also permits the ceramic piezoelectric element to vibrate at higher order modes of vibration with little damping (e.g. higher order modal displacement). In a transducer having a piezoelectric element with a backing, the piezoelectric element vibrates with a more uniform displacement, like a piston. Removing the backing allows the piezoelectric element to more readily vibrate in a non-uniform displacement mode. The higher order the mode shape of the piezoelectric element, the more nodal lines the piezoelectric element has. The higher order modal displacement of the piezoelectric element creates more trapping lines, although the correlation of trapping line to node is not necessarily one to one, and driving the piezoelectric element at a higher frequency will not necessarily produce more trapping lines.

In some embodiments, the piezoelectric element may have a backing that has a relatively small effect on the Q-factor of the piezoelectric element (e.g. less than 5%). The backing may be made of a substantially acoustically transparent material such as balsa wood, foam, or cork which allows the piezoelectric element to vibrate in a higher order mode shape and maintains a high Q-factor while still providing some mechanical support for the piezoelectric element. The backing layer may be a solid, or may be a lattice having holes through the layer, such that the lattice follows the nodes of the vibrating piezoelectric element in a particular higher order vibration mode, providing support at node locations while allowing the rest of the piezoelectric element to vibrate freely. The goal of the lattice work or acoustically transparent material is to provide support without lowering the Q-factor of the piezoelectric element or interfering with the excitation of a particular mode shape.

Referring now to FIG. 12A and FIG. 12B, the transducer assembly 1201 can further include a (BNC) connector 1250 and PCB (printed circuit board) mount 1240 in addition to other electrical components used to control and operate the ultrasonic transducer. A fluid-tight seal 1260 (e.g., an O-ring) can be provided between the flow/acoustic chamber and the polymeric film 1220 backing the piezoelectric material 1230. The acoustophoretic device 1200 and the transducer assembly 1201 include locating features for press-fitting and securing the pieces to one another. For example, the polymeric film 1220 can be die-cut and includes apertures 1224 through which fasteners 1226 can pass. Such fasteners can then be used to secure the transducer to the acoustophoretic device using locating features such as apertures 1214. Although the example embodiment in FIGS. 12A-12C depicts the locating features as including screws and holes, it is to be understood that any suitable locating features and securing means can be used (e.g. tongue-and-groove connections, adhesive, rivets).

Figure 11B:
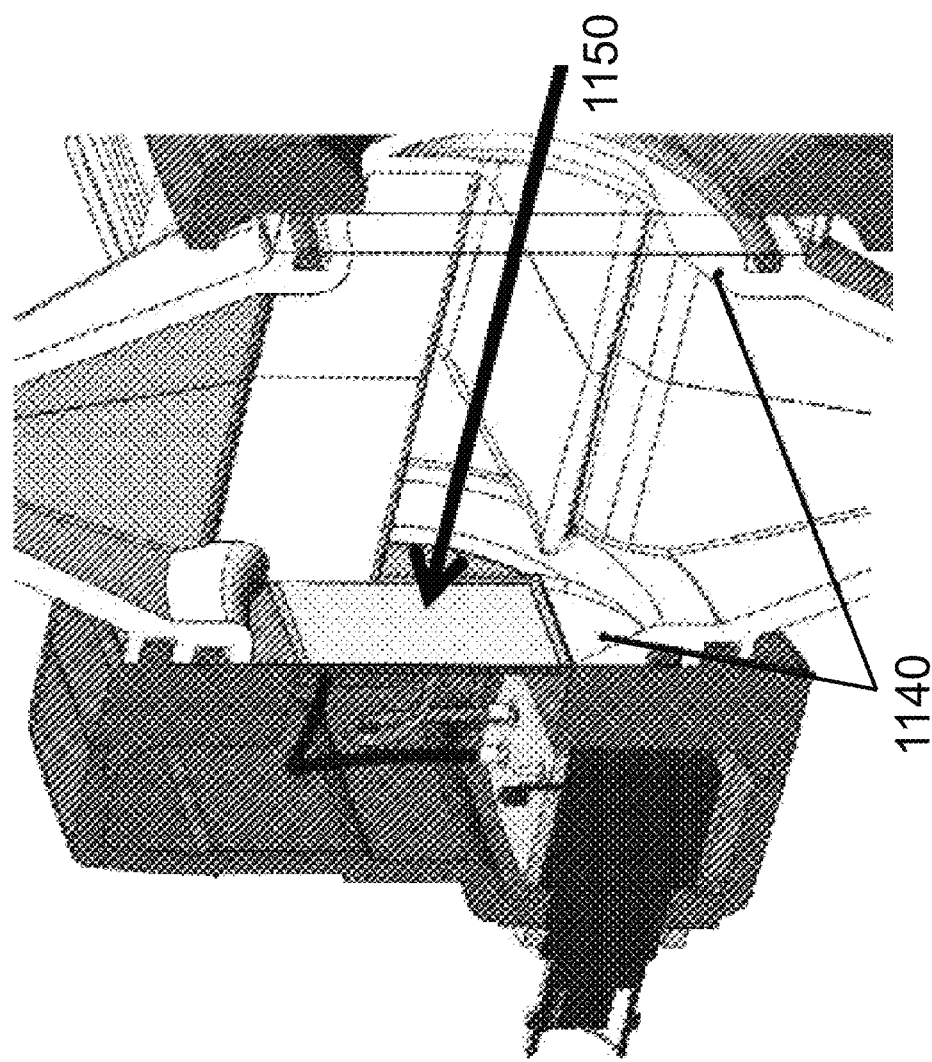
FIG. 11B is a magnified perspective cross-sectional view of a portion of the acoustophoretic device/stage of FIG. 3B showing the flow/acoustic chamber thereof.
Figure 11A:
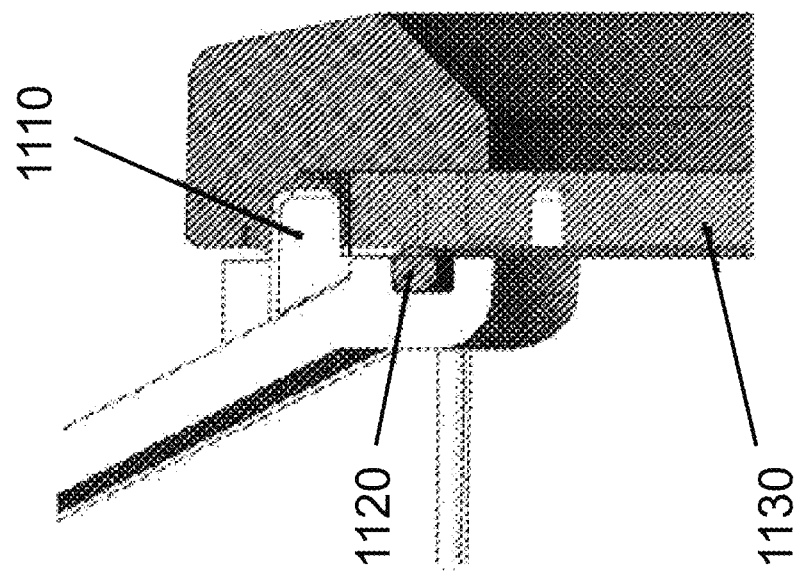
FIG. 11A is a magnified side cross-sectional view of a portion of the acoustophoretic device/stage of FIG. 3B.

Generally, as shown in FIG. 11A, locating features 1110 (e.g. apertures and fasteners, tongue and groove features) can be present to ensure a fluid-tight engagement of the different parts of the system. In addition, a fluid-tight seal 1120 (e.g., an O-ring) can be disposed at least partially between the reflector 1130 and the rest of the device, such as between an outer sidewall of the interlock portion of the device and an inner sidewall of the reflector 1130 as shown in FIG. 11A, or similarly between an outer sidewall of the interlock portion of the device and an inner sidewall of the transducer.

As shown in FIG. 11B, the flow/acoustic chamber is shaped such that shelves 1140 are present just below the piezoelectric material 1150 and reflector (not shown). The shelves 1140 taper downward from the acoustic region (i.e. the region in which the acoustic standing wave(s) is generated) and serve to prevent build-up of material that is trapped within the standing wave(s) and caused to agglomerate, coalesce, or concentrate therein. In this way, heaver/denser-than-fluid material that agglomerates, coalesces, or concentrates in the acoustic region grows to a sufficient size that it falls out of the standing wave(s), as explained herein, and can be deflected by the shelves 1140 toward the lower end of the acoustic filtering device where the material can be collected.

As illustrated in FIGS. 13A-13B, a reflector assembly 1300 may be provided to complement the transducer assembly 1201 of FIGS. 12A-12C. The reflector assembly 1300 includes a housing 1310 that supports a reflector 1330. The reflector may be rigid or flexible, and can be made of a high acoustic impedance material such as steel or tungsten, or any other suitable material providing good acoustic reflection. One specifically contemplated material for the reflector of the multi-stage acoustophoretic systems described herein is a glass, such as soda lime glass or borosilicate glass. Another transducer may also be used as a reflector.

The reflector assembly 1300 further includes a fluid-tight seal 1360 (e.g., an O-ring) between the flow/acoustic chamber and the reflective surface 1330. As can be best seen in FIG. 13A and FIG. 13B, the individual parts of the reflector assembly 1300 include locating features for press-fitting and securing the pieces to one another. For example, the housing can include locating features, such as in the form of apertures (not shown) through which fasteners 1326 can pass. Such fasteners 1326 can be used to secure the reflector assembly to the flow/acoustic chamber using locating features located thereon, such as apertures 1314. Although the example embodiment in FIG. 13A and FIG. 13C depicts the locating features as including screws and holes, it is to be understood that any suitable locating features and securing means can be used (e.g. tongue-and-groove connections, permanent fixation using an adhesive, rivets). FIG. 13C shows a partial cross-section of the transducer assembly 1200 and the reflector assembly 1300 secured to one another, such as by using a glue joint 1330 along the top end (and in other locations as desired). A permeate outlet is located proximate the top end of the flow/acoustic chamber, through which separated material can be recovered, as previously explained.

In the present systems, the particles are trapped and may be driven to stationary positions within the ultrasonic standing wave. The ultrasonic standing wave can be implemented at a certain frequency that provides a certain number of wavelengths within the acoustic chamber. The particles are collected along well defined trapping lines, separated by half a wavelength. Within each nodal plane, the particles are trapped in the minima of the acoustic radiation potential. The axial component of the acoustic radiation force drives the particles, with a positive contrast factor, to the pressure nodal planes, whereas particles with a negative contrast factor are driven to the pressure anti-nodal planes. The radial or lateral component of the acoustic radiation force contributes to trapping the particle in a lateral direction. The radial or lateral component of the acoustic radiation force is on the same order of magnitude as the axial component of the acoustic radiation force. As discussed above, the lateral force can be increased by driving the transducer in higher order mode shapes, as opposed to a form of vibration where the crystal effectively moves as a piston having a uniform displacement. The acoustic pressure is proportional to the driving voltage of the transducer. The electrical power is proportional to the square of the voltage.

The transducer can be driven by a drive signal, such as an electrical signal (AC, DC or combinations thereof), which can be a voltage signal or a current signal, a magnetic signal, an electromagnetic signal, a capacitive signal, or any other type of signal to which the transducer is responsive to create a multi-dimensional acoustic standing wave. In embodiments, the voltage signal driving the transducer can have a pulsed, sinusoidal, square, sawtooth, or triangle waveform; and have a frequency of 500 kHz to 10 MHz. The voltage signal can be driven with pulse width modulation, which can be used to produce any desired waveform. The voltage signal can be amplitude or frequency modulated. The drive signal may be turned on or off and/or configured with start/stop capability to, for example, control or eliminate streaming.

In some examples, the size, shape, and thickness of the transducer can determine the transducer displacement at different frequencies of excitation. Transducer displacement with different frequencies may affect separation efficiency. In some examples, the transducer is operated at frequencies near the thickness resonance frequency (half wavelength). The presence of gradients in transducer displacement can result in more places for particles to be trapped. Higher order modal displacements can generate three-dimensional acoustic standing waves with strong gradients in the acoustic field in all directions, thereby creating similarly strong acoustic radiation forces in all directions, which forces may, for example, be on the same order of magnitude. The higher order modal displacements can lead to multiple trapping lines. The number of trapping lines correlate with the particular mode shape of the transducer.

To investigate the effect of the transducer displacement profile on acoustic trapping force and separation efficiencies, an experiment was repeated ten times using a 1"×1" square transducer, with all conditions identical except for the excitation frequency. Ten consecutive acoustic resonance frequencies, indicated by circled numbers 1-9 and letter A on FIG. 14, were used as excitation frequencies. The conditions were experiment duration of 30 min, a 1000 ppm oil concentration of approximately 5-micron SAE-30 oil droplets, a flow rate of 500 ml/min, and an applied power of 20 W. Oil droplets were used because oil is less dense than water, and can be separated from water using acoustophoresis.

Figure 14:
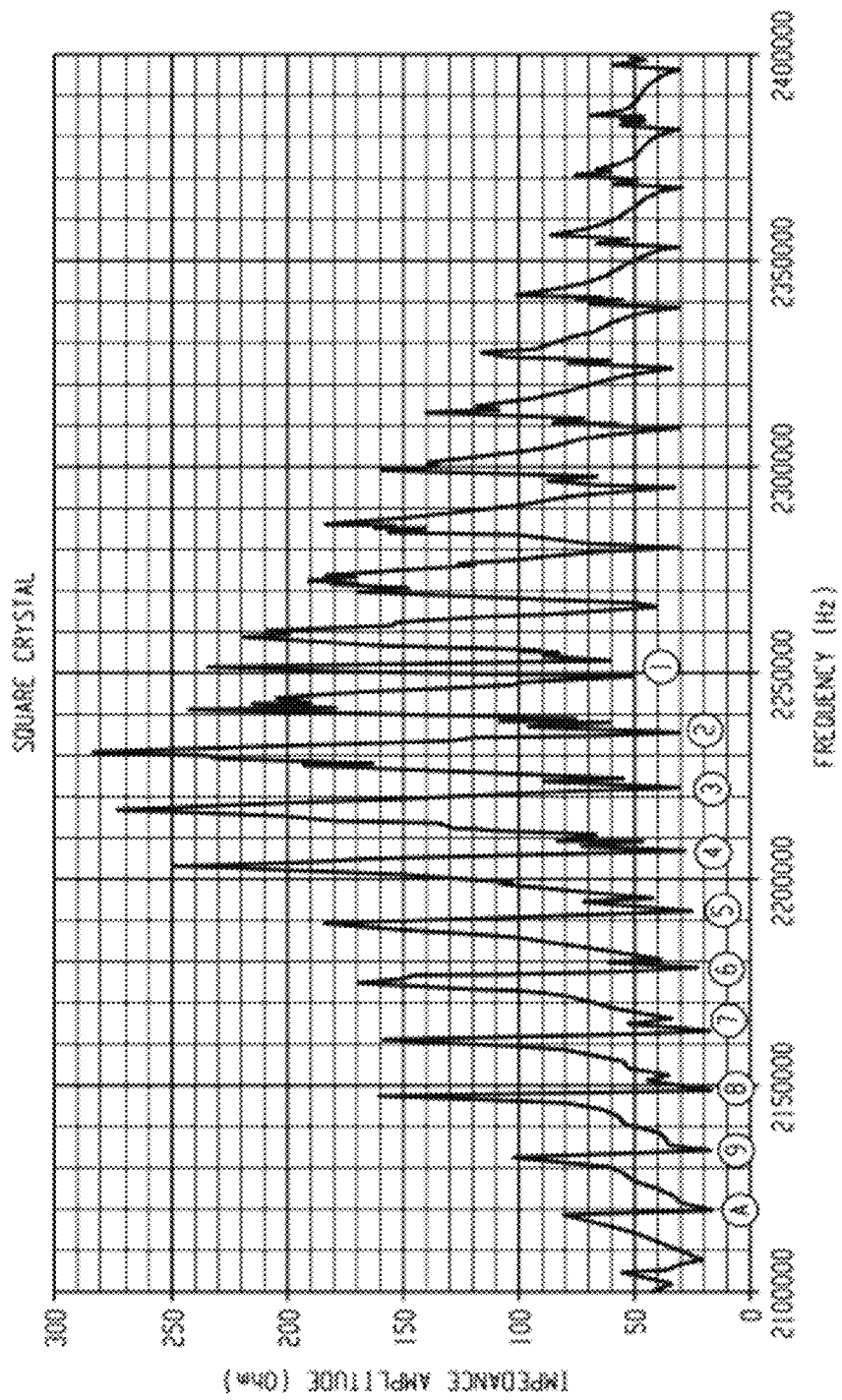
FIG. 14 is a graph of electrical impedance amplitude versus frequency for a square transducer driven at different frequencies.

FIG. 14 shows the measured electrical impedance amplitude of the transducer as a function of frequency in the vicinity of the 2.2 MHz transducer resonance when operated in a water column containing oil droplets. The minima in the transducer electrical impedance correspond to acoustic resonances of the water column and represent potential frequencies for operation. Additional resonances exist at other frequencies where multi-dimensional standing waves are excited. Numerical modeling has indicated that the transducer displacement profile varies significantly at these acoustic resonance frequencies, and thereby directly affects the acoustic standing wave and resulting trapping force. Since the transducer may be operated near its thickness resonance, the displacements of the electrode surfaces are essentially out of phase. The displacement of the transducer electrodes may not be uniform and varies depending on frequency of excitation. As an example, at one frequency of excitation with a single line of trapped oil droplets, the displacement has a single maximum in the middle of the electrode and minima near the transducer edges. At another excitation frequency, the transducer profile has multiple maxima leading to multiple trapped lines of oil droplets. Higher order transducer displacement patterns can result in higher trapping forces and multiple stable trapping lines for the captured oil droplets.

To investigate the effect of the transducer displacement profile on acoustic trapping force and oil separation efficiencies, an experiment was repeated ten times, with all conditions identical except for the excitation frequency. Ten consecutive acoustic resonance frequencies, indicated by circled numbers 1-9 and letter A on FIG. 14, were used as excitation frequencies. The conditions were experiment duration of 30 min, a 1000 ppm oil concentration of approximately 5-micron SAE-30 oil droplets, a flow rate of 500 ml/min, and an applied power of 20 W.

As the emulsion passed by the transducer, the trapping lines of oil droplets were observed and characterized. The characterization involved the observation and pattern of the number of trapping lines across the fluid channel, as shown in FIG. 15A, for seven of the ten resonance frequencies identified in FIG. 14.

FIG. 15B shows an isometric view of the flow chamber and acoustic wave zone of separation in which the trapping line locations are being determined. FIG. 15C is a view of the ultrasonic transducer volume as it appears when looking down the inlet, along arrow 151. FIG. 15D is a view of the ultrasonic transducer volume as it appears when looking directly at the transducer face, along arrow 153.

The excitation frequency in this example determines the number of trapping lines, which vary from a single trapping line at the excitation frequency of acoustic resonance 5 and 9, to nine trapping lines for acoustic resonance frequency 4. At other excitation frequencies four or five trapping lines are observed. Different displacement profiles of the transducer can produce different (more or less) trapping lines in the standing waves, with more gradients in the displacement profile generally creating greater trapping forces and more trapping lines.

Figure 16:
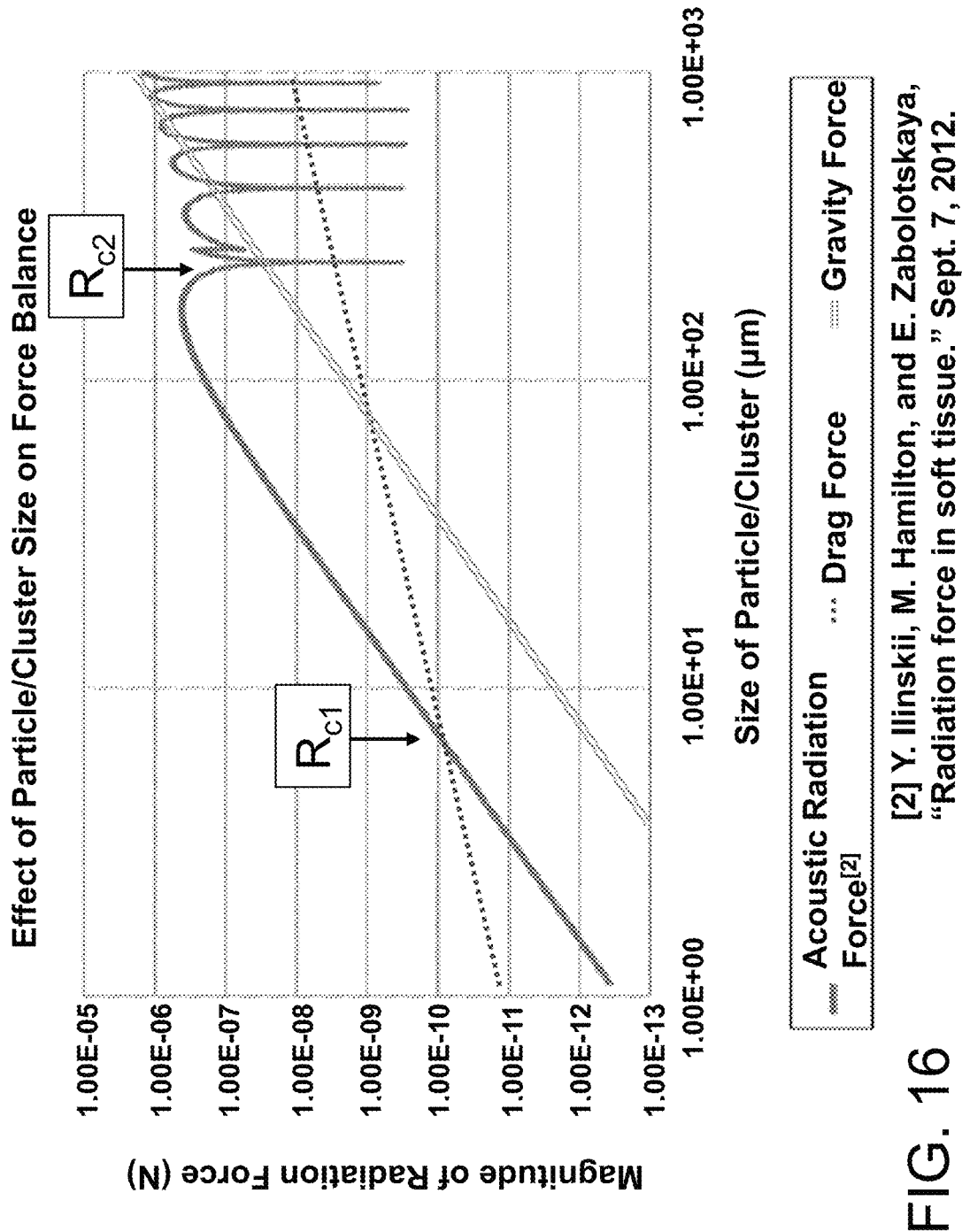
FIG. 16 is a graph showing the relationship of the acoustic radiation force, buoyancy force, and Stokes' drag force to particle size. The horizontal axis is in microns (μm) and the vertical axis is in Newtons (N).

FIG. 16 is a lin-log graph (linear y-axis, logarithmic x-axis) that shows the calculated scaling of the acoustic radiation force, fluid drag force, and buoyancy force with particle radius. The buoyancy force is applicable to negative contrast factor particles, such as oil particles in this example. The calculated buoyancy force may include elements of gravity forces. In examples using positive contrast factor particles, which may include some types of cells, a line indicating gravity forces is used in a graph for such positive contrast factor particles showing acoustic radiation force and fluid drag force. In the present example illustrated in FIG. 16, calculations are done for a typical SAE-30 oil droplet used in experiments. The buoyancy force is a particle volume dependent force, e.g., proportional to the radius cubed, and is relatively negligible for particle sizes on the order of a micron, but grows, and becomes significant for particle sizes on the order of hundreds of microns. The fluid drag force scales linearly with fluid velocity, e.g., proportional to the radius squared, and may exceed the buoyancy force for micron sized particles, but is less influential for larger sized particles on the order of hundreds of microns. The acoustic radiation force scaling acts differently than the fluid drag force or the buoyancy force. When the particle size is small, the acoustic trapping force scales with the cube of the particle radius (volume) of the particle at a close to linear rate. Eventually, as the particle size grows, the acoustic radiation force no longer increases linearly with the cube of the particle radius. As the particle size continues to increase, the acoustic radiation force rapidly diminishes and, at a certain critical particle size, is a local minimum. For further increases of particle size, the radiation force increases again in magnitude but with opposite phase (not shown in the graph) and again diminishes. This pattern repeats for increasing particle sizes. The particle size to acoustic radiation force relationship is at least partially dependent on the wavelength or frequency of the acoustic standing wave. For example, as a particle increases to a half-wavelength size, the acoustic radiation force on the particle decreases. As a particle size increases to greater than a half-wavelength and less than a full wavelength, the acoustic radiation force on the particle increases.

Initially, when a suspension is flowing through the acoustic standing wave with primarily small micron sized particles, the acoustic radiation force balances the combined effect of fluid drag force and buoyancy force to trap a particle in the standing wave. In FIG. 16, trapping occurs for a particle size of about 3.5 micron, labeled as $R_{c1}$. In accordance with the graph in FIG. 16, as the particle size continues to increase beyond $R_{c1}$, larger particles are trapped, as the acoustic radiation force increases compared to the fluid drag force. As small particles are trapped in the standing wave, particle coalescence/clumping/aggregation/agglomeration takes place, resulting in continuous growth of effective particle size. Other, smaller particles continue to be driven to trapping sites in the standing wave as the larger particles are held and grow in size, contributing to continuous trapping. As the particle size grows, the acoustic radiation force on the particle increases, until a first region of particle size is reached. As the particle size increases beyond the first region, the acoustic radiation force on the particle begins to decrease. As particle size growth continues, the acoustic radiation force decreases rapidly, until the buoyancy or gravity force becomes dominant, which is indicated by a second critical particle size, $R_{c2}$, at which size the particles rise or sink, depending on their relative density with respect to the host fluid. As the particles rise or sink and leave the antinode (in the case of negative contrast factor) or node (in the case of positive contrast factor) of the acoustic standing wave, the acoustic radiation force on the particles may diminish to a negligible amount. The acoustic radiation force continues to trap small and large particles, and drive the trapped particles to a trapping site, which is located at a pressure antinode in this example. The smaller particle sizes experience a reduced acoustic radiation force, which, for example, decreases to that indicated near point $R_{c1}$. As other particles are trapped and coalesce, clump, aggregate, agglomerate and/or cluster together at the node or antinode of the acoustic standing wave, effectively increasing the particle size, the acoustic radiation force increases and the cycle repeats. All of the particles may not drop out of the acoustic standing wave, and those remaining particles may continue to grow in size. Thus, FIG. 16 explains how small particles can be trapped continuously in a standing wave, grow into larger particles or clumps, and then eventually rise or settle out because of the relationship between buoyancy force, drag force and acoustic radiation force with respect to particle size.

Various coatings may be used on the internal flow chambers of the acoustophoretic devices. Such coatings can include epoxies, for example epichlorohydrin bisphenol crosslinked with an amine or a polyamide; or polyurethane coatings, for example a polyester polyol crosslinked with aliphatic isocyanates. Such coatings are useful for producing a smooth surface and/or reducing surface tension, permitting cells to slide better under the influence of gravity along the flow chamber surface and into desired locations (such as collection well modules).

The flow rate of the acoustophoretic device may be controlled, for example, by a pump. The flow rate can be regulated in conjunction with gravity/buoyancy to manage particle aggregates. Particle/fluid mixture passing in/out of the flow chambers in the acoustophoretic devices through the inlets/outlets thereof can flow at rates of up to about 10 liters per hour (L/hr), including up to about 50 L/hr, but often at about 3.6 L/hr. By way of comparison, the flow rate out of the collection well modules through the ports is much less, from about 3 ml/min up to about 10 ml/min.

The acoustophoretic systems of the present disclosure can be used in a filter "train," in which multiple different filtration steps are used to clarify or purify an initial fluid/particle mixture to obtain the desired product and manage different materials from each filtration step. Each filtration step can be optimized to remove a particular material, improving the overall efficiency of the clarification process. An individual acoustophoretic device can operate as one or multiple filtration steps. For example, each individual ultrasonic transducer within a particular acoustophoretic device can be operated to trap materials within a given particle range. The acoustophoretic device can be used to remove large quantities of material, reducing the burden on subsequent downstream filtration steps/stages. Additional filtration steps/stages can be placed upstream or downstream of the acoustophoretic device, such as physical filters or other filtration mechanisms known in the art, such as depth filters (e.g., polymeric morphology, matrix media adsorption), sterile filters, crossflow filters (e.g., hollow fiber filter cartridges), tangential flow filters (e.g., tangential flow filtration cassettes), adsorption columns, separation columns (e.g., chromatography columns), or centrifuges. Multiple acoustophoretic devices or techniques can be used as well. It is particularly contemplated that desirable biomolecules or cells can be recovered/separated after such filtration/purification, as explained herein.

The outlets of the acoustophoretic devices of the present disclosure (e.g. permeate, concentrate, and flow outlets) can be fluidly connected to any other filtration step or filtration stage. Similarly, the inlets of the acoustophoretic separators/filtering devices of the present disclosure may be fluidly connected to any other filtration step or filtration stage. That is, it is specifically contemplated that the additional filtration steps/stages may be located upstream (i.e., between the acoustophoretic separators(s) and the bioreactor), downstream, or both upstream and downstream of the acoustophoretic separators(s). The additional filtration stages discussed above may also be used in series or parallel with one or more acoustophoretic devices or techniques. In particular, it is to be understood that the acoustophoretic separators of the present disclosure can be used in a system in combination with as few or as many filtration stages/steps located upstream or downstream thereof, or in series or parallel, or in single or multiple combinations as is desired. For avoidance of doubt, it is contemplated that the present systems and/or techniques can include a bioreactor, one or more acoustophoretic separator/filtering devices or techniques, and one or more filtrations stages/steps located upstream and/or downstream of the acoustophoretic separator, with the filtrations stage(s) and acoustophoretic separator(s) arranged in serial or parallel and fluidly connected to one another.

For example, when it is desired that the system include a filtration stage (e.g., a porous filter) located upstream of the acoustophoretic separator, the outlet of the bioreactor can lead to an inlet of the porous filter and the outlet of the porous filter can lead to an inlet of the acoustophoretic separator, with the porous filter pre-processing the input to the acoustophoretic separator. As another example, when it is desired that the system include a filtration stage (e.g., a separation column) located downstream of the acoustophoretic separator, the outlet of the bioreactor can lead to an inlet of the acoustophoretic separator and the outlet of the acoustophoretic separator can lead to an inlet of the separation column, with the separation column further processing the fluid therein.

Filtration steps/stages can include various techniques or methods such as an additional acoustophoretic separator/filtering device, or physical filtration means such as depth filtration, sterile filtration, size exclusion filtration, or tangential filtration. Depth filtration uses physical porous filtration mediums that can retain material through the entire depth of the filter. In sterile filtration, membrane filters with extremely small pore sizes are used to remove microorganisms and viruses, generally without heat or irradiation or exposure to chemicals. Size exclusion filtration separates materials by size and/or molecular weight using physical filters with pores of given size. In tangential filtration, the majority of fluid flow is across the surface of the filter, rather than into the filter.

Chromatography can be used, including cationic chromatography columns, anionic chromatography columns, affinity chromatography columns, and/or mixed bed chromatography columns. Other hydrophilic/hydrophobic processes can be used for filtration purposes.

Secondary depth filtration product selection can be achieved with some screening of the material to be filtered.

In a typical fed-batch culture of a CHO-S based cell line expressing a humanised IgG1 mAb, depth filters having total volumes of less than about 5 L to less than about 25 L and total areas of about 0.002 m² to about 0.1 m² can be used for secondary depth filtration. In this regard, suitable depth filters include the Supracap™ HP depth filter capsules available from Pall Corporation. Post clarification, the harvested cell culture fluid (HCCF) may be optionally stored, filtered to control the bioburden, and stored or filtered to control the bioburden and be processed chromatographically. In a typical fed-batch culture of a CHO-S based cell line expressing a humanised IgG1 mAb, the sterile filters (i.e., sterilizing-grade membrane filters) having total volumes of less than about 5 L to less than about 25 L and total areas of about 220 cm² to about 375 cm² can be used. In this regard, suitable sterile filters include the Kleencar® capsules and mini Kleenpak capsules available from Pall Corporation.

Tertiary depth filtration may optionally be omitted at small scale, but, when used, can prevent fouling of subsequent filters and allow for a reduction in size of the bioburden control filter. In a typical fed-batch culture of a CHO-S based cell line expressing a humanised IgG1 mAb, the same depth filters used for secondary depth filtration can be used for tertiary depth filtration. Post clarification, the same sterile filters as described above can be used.

In biological applications, each of the parts of the system e.g., each stage, tubing fluidly connecting the same, etc., can be separated from each other and be disposable. Replacing centrifuges and/or conventional porous filters with acoustophoretic devices may allow better separation of cells without lowering the viability of the cells. The transducers may also be driven to create rapid pressure changes to prevent or clear blockages due to agglomeration of cells. The frequency of the transducers may also be varied to increase or optimize effectiveness for a given power.

The present disclosure has been described with reference to exemplary embodiments. Modifications and alterations may occur to others upon reading and understanding the preceding detailed description. It is intended that the present disclosure be construed as including all such modifications and alterations insofar as they come within the scope of the appended claims or the equivalents thereof.

The invention claimed is:

1. A transducer assembly, comprising:
   a housing with an open interior and an exterior and an opening between the interior and the exterior;
   a polymeric film covering the opening in the housing;
   a piezoelectric material attached to the polymeric film; and
   electrodes connected to the piezoelectric material.

2. The transducer assembly of claim 1, wherein the piezoelectric material is free of the housing.

3. The transducer assembly of claim 1, wherein the piezoelectric material is spaced from the housing.

4. The transducer assembly of claim 1, wherein the piezoelectric material is configured to be driven in a higher order mode.

5. The transducer assembly of claim 1, wherein the piezoelectric material is attached to the polymeric film by an adhesive coating on the polymer film.

6. The transducer assembly of claim 5, wherein the adhesive is a pressure-sensitive acrylic polymer.

7. The transducer assembly of claim 1, wherein the polymeric film is polyetherether ketone (PEEK).

8. The transducer assembly of claim 1, further comprising positive and negative leads to the piezoelectric material.

9. The transducer assembly of claim 1, wherein the housing further comprises a connector and a printed circuit board (PCB) mount.

10. An acoustophoretic system, comprising:
    an acoustic chamber for containing a fluid;
    a transducer assembly including a housing with an open interior and an exterior and an opening between the interior and the exterior, a polymer film covering the opening in the housing, and a piezoelectric material attached to the polymer film; and
    a reflector opposite the transducer assembly for reflecting acoustic energy.

11. The acoustophoretic system of claim 10, wherein the piezoelectric material is spaced from the housing.

12. The acoustophoretic system of claim 10, wherein the piezoelectric material is configured to be driven in a higher order mode.

13. The acoustophoretic system of claim 10, wherein the piezoelectric material is attached to the polymeric film by an adhesive coating on the polymeric film.

14. The acoustophoretic system of claim 13, wherein the adhesive is a pressure-sensitive acrylic polymer.

15. The acoustophoretic system of claim 10, wherein the polymer film is polyetherether ketone (PEEK).

16. The acoustophoretic system of claim 10, wherein the reflector comprises glass.

17. The transducer assembly of claim 1, wherein the polymeric film is acoustically transparent.

18. The acoustophoretic system of claim 10, wherein the polymer film is acoustically transparent.

* * * * *